(12) United States Patent
Bookout et al.

(10) Patent No.: US 8,358,830 B2
(45) Date of Patent: Jan. 22, 2013

(54) METHOD FOR DETECTING OPTICAL DEFECTS IN TRANSPARENCIES

(75) Inventors: Ronald L. Bookout, Florissant, MO (US); Michael P. Gleason, Edwardsville, IL (US); Matthew M. Thomas, Maryland Heights, MO (US); Michael S. Dixon, Brentwood, MO (US); Robert Pless, Saint Louis, MO (US); William D. Smart, Clayton, MO (US)

(73) Assignee: The Boeing Company, Chicago, IL (US)

(*) Notice: Subject to any disclaimer, the term of this patent is extended or adjusted under 35 U.S.C. 154(b) by 382 days.

(21) Appl. No.: 12/732,798

(22) Filed: Mar. 26, 2010

(65) Prior Publication Data

US 2011/0235894 A1    Sep. 29, 2011

(51) Int. Cl.
*G06K 9/00* (2006.01)

(52) U.S. Cl. .................. 382/141; 356/237.1; 356/237.6

(58) Field of Classification Search .................. 382/141; 356/237.1–237.6
See application file for complete search history.

(56) References Cited

U.S. PATENT DOCUMENTS

| | | | |
|---|---|---|---|
| 4,461,570 A | 7/1984 | Task | |
| 5,179,419 A | 1/1993 | Palmquist | |
| 5,343,288 A | 8/1994 | Cohen | |
| 5,479,276 A | 12/1995 | Herbermann | |
| 5,650,828 A | 7/1997 | Lee | |
| 5,680,476 A * | 10/1997 | Schmidt et al. | 382/159 |
| 6,208,412 B1 * | 3/2001 | Ladewski | 356/239.1 |
| 6,658,149 B1 * | 12/2003 | Wakahara et al. | 382/215 |
| 7,263,220 B2 * | 8/2007 | Crandall et al. | 382/165 |
| 7,365,838 B2 | 4/2008 | Jones | |
| 2006/0092276 A1 | 5/2006 | Ariglio et al. | |
| 2006/0262972 A1 * | 11/2006 | Hiraoka | 382/141 |
| 2007/0036420 A1 * | 2/2007 | Enachescu et al. | 382/141 |
| 2007/0036466 A1 * | 2/2007 | De Haan | 382/289 |

OTHER PUBLICATIONS

ISRA Vision, "Fully Automated Final Optical Inspection of Automotive Glass: Inspects for Straying, Distorting and Absorbing Defects With One Modular System", Dec. 2006.
ISRA Vision, "A Unique System That Inspects Glass Sheets for Every Processing Stage in Any Formation Without Interruption and in a Highly Flexible Manner", Dec. 2006.
American Society for Testing and Materials,"Standard Practice for Optical Distortion and Deviation of Transparent Parts Using the Double-Exposure Method," ASTM F733-90(2003), available at <http://www.astm.org/Standards/F733.htm> last visited on Feb. 9, 2009.
American Society for Testing and Materials, "Standard Test Method for Measuring the Transmissivity of Transparent Parts," D 1003-07, Apr. 2008.

(Continued)

*Primary Examiner* — Tarifur Chowdhury
*Assistant Examiner* — Isiaka Akanbi
(74) *Attorney, Agent, or Firm* — Novatech IP Law

(57) ABSTRACT

A method of detecting optical defects in a transparency may comprise the steps of providing a digital image of the transparency having a plurality of image pixels and detecting at least one candidate defect. The candidate defect may be detected by determining a grayscale intensity of each one of the image pixels and calculating an intensity gradient across adjacent pairs of the image pixels. Each image pixel may be assigned a gradient value comprising a maximum of the absolute value of the intensity gradients associated with the image pixel. A gradient image may be constructed comprising the gradient values assigned to corresponding ones of the image pixels. Image pixels may be identified as candidate pixels if such image pixels have a gradient value exceeding a gradient threshold. The candidate pixels may comprise the optical defect.

15 Claims, 24 Drawing Sheets

OTHER PUBLICATIONS

American Society for Testing and Materials, "Standard Test Method for Haze and Luminous Transmittance of Transparent Plastics1," F 1316-90, Nov. 2007.

International Searching Authority, International Search Report for PCT/US2011/026725, May 26, 2011.

Francesco Adamo et al., "An online defects inspection system for satin glass based on machine vision", 2009 IEEE Intrumentation and Measurement Technology Conference (I2MTC) May 5, 2009.

Wilkinson, Michael "Gaussian-Weighted Moving-Window Robust Automatic Threshold Selection"; "Chapter" In: Petkov, Nicolai; Westenberg, Michel,"Lecture Notes in Computer Science. Computer Analysis of Images and Patterns", vol. 2756, pp. 369-376, Aug. 25, 2003.

Nixon M, "Shape inspection of crystal glassware", IEEE Conference on Image Processing and Its Applications, pp. 227-231, Jul. 18, 1989.

* cited by examiner

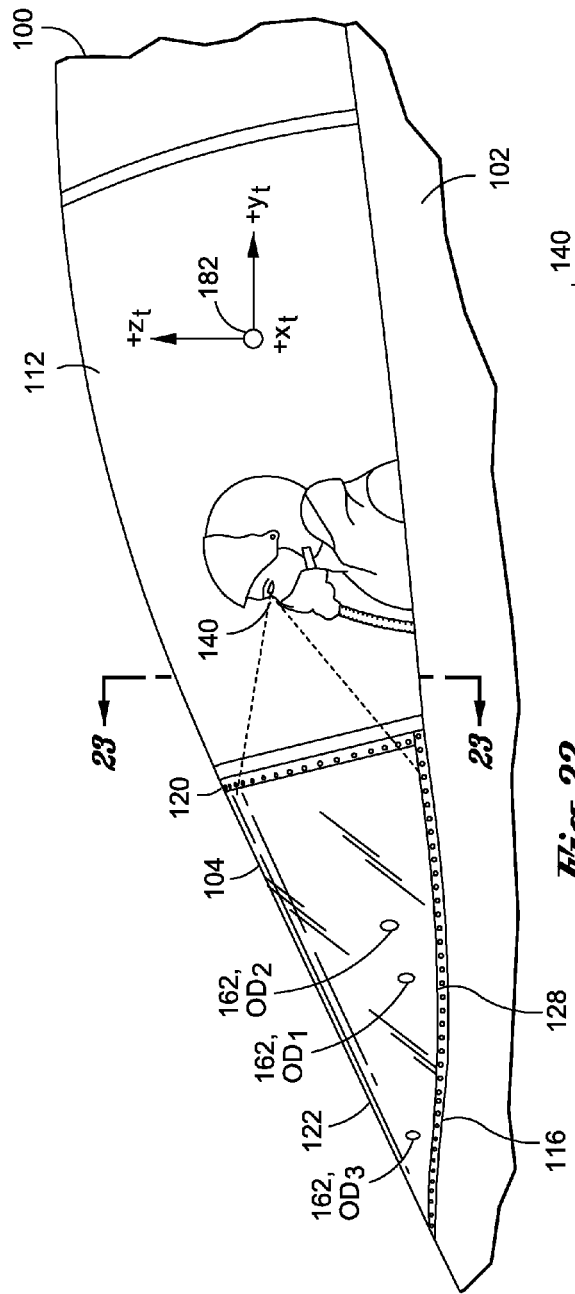
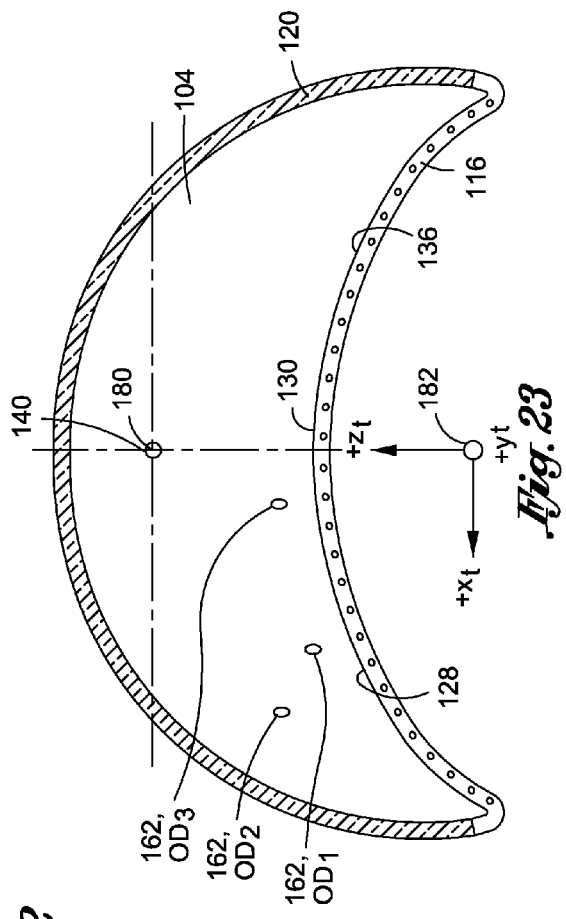

$$f(x,y) = \begin{bmatrix} 0 & 0 & 0 & 0 & 0 & 0 & 0 \\ 0 & 0 & 1 & 0 & 0 & 0 & 0 \\ 0 & 1 & 1 & 1 & 0 & 0 & 0 \\ 0 & 0 & 1 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix}$$

*Fig. 26A*

$$g(x,y) = \begin{bmatrix} 0 & 1 & 0 \\ 1 & 1 & 1 \\ 0 & 1 & 0 \end{bmatrix}$$

*Fig. 26B*

$$f*g = \begin{bmatrix} 2/9 & 2/9 & 2/9 & 0 & 0 \\ 2/9 & 5/9 & 2/9 & 1/9 & 0 \\ 2/9 & 2/9 & 2/9 & 0 & 0 \\ 0 & 1/9 & 0 & 0 & 0 \\ 0 & 0 & 0 & 0 & 0 \end{bmatrix}$$

*Fig. 26C*

METHOD FOR DETECTING OPTICAL DEFECTS IN TRANSPARENCIES

CROSS-REFERENCE TO RELATED APPLICATIONS

This application is related to pending application Ser. No. 12/394,012 entitled SYSTEM AND METHOD FOR DETECTING OPTICAL DEFECTS IN TRANSPARENCIES filed on Feb. 26, 2009, the entire contents of which is incorporated by reference herein.

STATEMENT RE: FEDERALLY SPONSORED RESEARCH/DEVELOPMENT (Not Applicable)

FIELD

The present disclosure relates generally to inspection systems and, more particularly, to a method for detecting optical defects in transparencies.

BACKGROUND

Transparencies are used in a variety of different applications including vehicular applications such as in marine, land, air and/or space vehicles and in non-vehicular applications such as in buildings and other stationary structures. In vehicular applications such as in commercial aircraft, transparencies may be mounted along the aircraft cabin and around the aircraft flight deck and may include windshields and other forward, side and overhead windows. Transparencies may be formed of glass and polymeric materials or as laminated combinations of glass and polymeric materials. Polymeric materials for transparencies may include, without limitation, acrylic and polycarbonate compositions.

When fabricating a transparency of polycarbonate material, certain optical defects may occur during the forming process. For example, carbon particulates may occur during the formation of a polycarbonate transparency and may appear as relatively small black spots that are embedded within the transparency. When viewed through the transparency, an embedded carbon particulate may be misinterpreted as a long-distance object.

Included in the prior art are several methods for inspecting transparencies for optical defects. For example, certain aircraft transparencies such as an aircraft canopy may be manually inspected by looking upwardly though the canopy searching for defects by using the sky as a background to backlight the transparency. This inspection technique requires generally clear (e.g., non-cloudy) atmospheric conditions in order to provide a homogenously lit background against which an inspector can view the entirety of the transparency. As may be expected, this inspection technique can result in significant aircraft downtime while waiting for the appropriate atmospheric conditions.

Although camera-driven methods have been developed in the automotive industry for automating inspection of transparencies, such automated camera methods may lack the resolution required for aerospace transparencies. For example, inspection methods used in the automotive industry are typically directed toward high-speed inspection on a production line wherein the size of allowable defects in the automotive transparency is typically larger than the allowable defect size (e.g., 0.030 inch) of aerospace transparencies. In this regard, the resolution at which an automotive transparency is inspected is sacrificed in the interest of high-volume production.

Furthermore, inspection methods used in the automotive industry are typically directed toward transparencies having relatively slight curvatures as compared to aircraft transparencies such as aircraft canopies and windshields which may have more complex curves that may be of smaller radius. In addition, the cross-sectional layup of an aircraft transparency such as an aircraft windshield is generally more complex than an automotive transparency due to the higher strength requirements and increased thickness (e.g., up to 1 inch thick or larger) of an aircraft windshield as required for surviving bird strikes and handling structural loads.

As can be seen, there exists a need in the art for a method for accurate detection of defects of relatively small size (e.g., approximately 0.010 inch or smaller). Additionally, there exists a need in the art for a method for detecting optical defects in a transparency in a rapid manner in order to reduce inspection time. Furthermore, there exists a need in the art for a method for detecting optical defects in a transparency that provides an automated means for documenting the size and location of optical defects in order to characterize the source of the defect. The need to accurately quantify an optical defect (e.g., measure the defect size and document the location) in an aircraft transparency is desirable due to the relatively high cost of replacing an aircraft windshield as compared to the cost of replacing an automotive windshield.

BRIEF SUMMARY

The above-noted needs associated with inspection of transparencies are specifically addressed and alleviated by the present disclosure which provides an optical defect detection method for detecting the size and location of optical defects down to a relatively small size (e.g., 0.010 inch).

The technical effects of the defect detection system include an improvement in the reliability, speed and accuracy with which transparencies may be inspected for optical defects as compared to prior art manual inspection methods. In addition, the defect detection system provides a means for reliably detecting optical defects of relatively small size and recording and documenting at least the size and/or location of such optical defects.

In an embodiment, the method of detecting optical defects in the transparency may comprise the steps of providing a digital image of the transparency wherein the digital image includes a plurality of image pixels which may each have a grayscale intensity. The method may further include detecting at least one candidate defect in the transparency by calculating an intensity gradient across adjacent pairs of the image pixels. In addition, each one of the image pixels may be assigned a gradient value which may comprise a maximum of the absolute value of the intensity gradients that are associated with the image pixel. A gradient image may be constructed comprising the gradient values that are assigned to corresponding ones of the image pixels. Image pixels having a gradient value exceeding a gradient threshold may be identified as candidate pixels. Such candidate pixels may comprise one of the candidate defects.

In a further embodiment, disclosed is a method of characterizing optical defects in a transparency comprising the steps of providing the digital image of the transparency and identifying candidate pixels from among the image pixels. The candidate pixels may comprise at least one candidate defect. The location of each one of the candidate pixels may be identified. The candidate pixels may be clustered into pixel clusters based upon the relative locations of the candidate pixels. The quantity of candidate pixels in each one of the pixel clusters may be compared to a pixel quantity threshold in order to identify the candidate defect as an optical defect or an image defect.

An additional embodiment of the method may comprise optimizing the settings of an image recording device for recording the digital image of the transparency. The settings may be based upon the parameters of the transparency such as the average hue of the transparency. The selection of the settings may include selecting an F setting, an ISO setting and a color setting such as for each one of the primary colors (red, green, and blue—RGB) that may be recorded by the image recording device. The F setting represents the f-stop or relative aperture and is a measure of the focal length of the lens of the image recording device divided by the effective aperture diameter of the lens. The ISO setting (i.e., film speed) is a measure of the light sensitivity of a digital imaging system such as the image recording device disclosed herein.

The method may further comprise recording the digital image of the transparency such as in color format and converting the digital image from color format to grayscale format. The grayscale intensity of each one of the image pixels in the digital image may be determined. The method may further comprise detecting a perimeter of the viewing portion of the transparency by selecting a predefined perimeter of the viewing portion or by comparing the change in grayscale intensity (i.e., the intensity gradient) across a series of a predetermined quantity of image pixels. A change in grayscale intensity across the series of pixels may be compared to a threshold intensity change rate or the change in grayscale intensity may be compared to a threshold uniformity value of a series of intensity gradients in order to identify the perimeter of the viewing portion.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 22 is a side view of the cockpit of the aircraft of FIG. 1 and illustrating a design eye (i.e., pilot eye position) reference point for characterizing the location of the optical defects in the transparency by transformation of the optical defect in the digital image to the transparency using a first fixed coordinate transformation;

FIG. 23 is a view of the windshield taken along line 23 of FIG. 22 and illustrating the relative locations of the optical defects in the transparency following the transformation using the fixed coordinate transformation;

FIGS. 26A-26C illustrate a modeling function f(x,y) (FIG. 26A), an equivalent function g(x,y) (FIG. 26B) and a two-dimensional convolution matrix f*g (FIG. 26C) for characterizing a shape of the optical defect.

DETAILED DESCRIPTION

Figure 1:
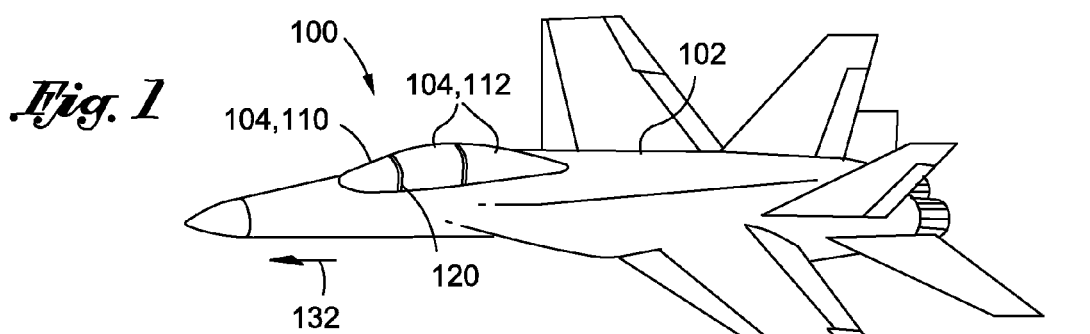
FIG. 1 is a perspective illustration of an aircraft having one or more transparencies.
Figure 8:
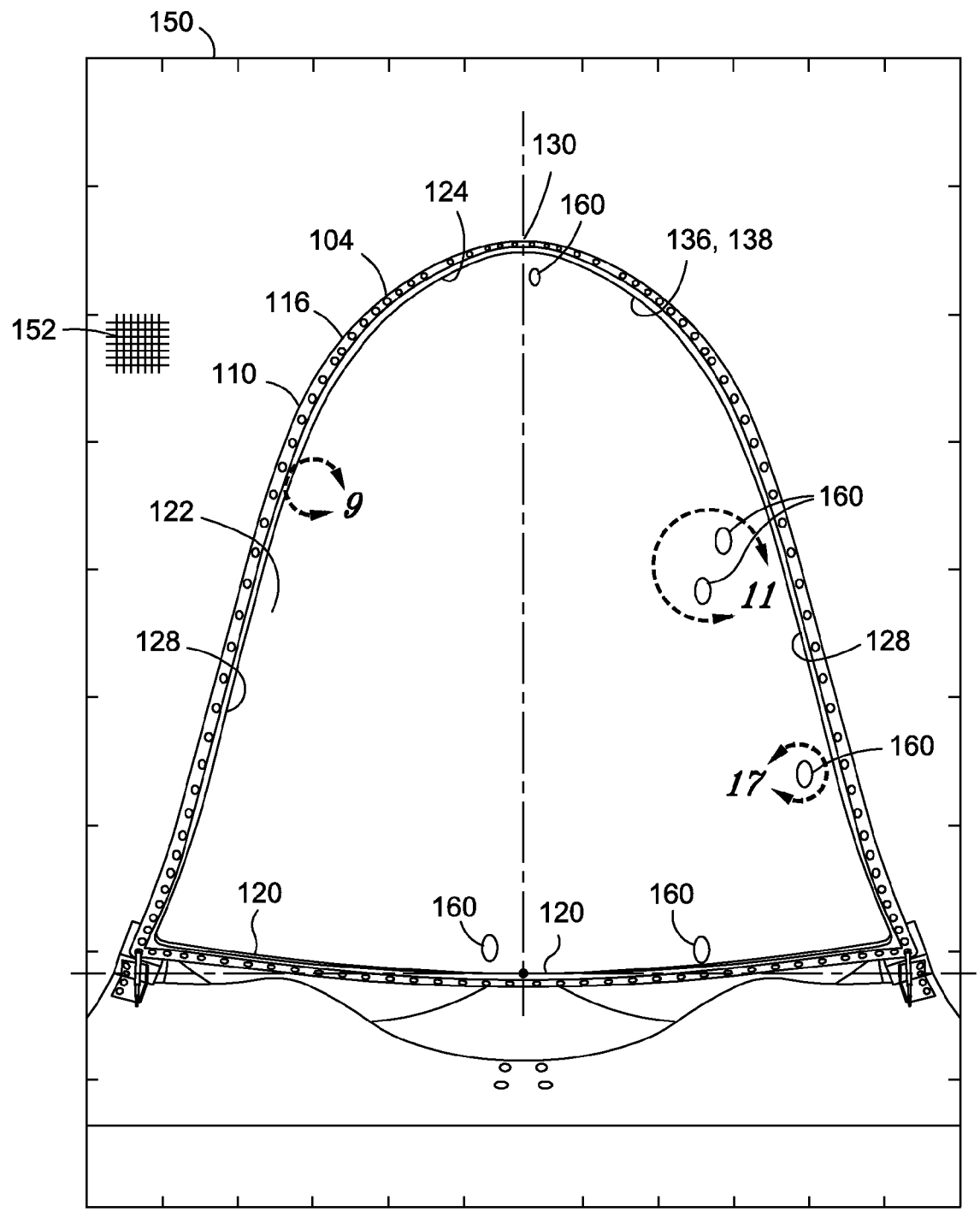
FIG. 8 is a panoramic digital image file of the transparency as may be recorded by the image recording device illustrated in FIG. 7.

Referring now to the drawings wherein the showings are for purposes of illustrating preferred and various embodiments of the disclosure only and not for purposes of limiting the same, shown in FIGS. 2-5 is an optical defect detection system 10 for recording an image of a transparency 104 such as an aircraft 100 transparency 104 as illustrated in FIG. 1. The image may comprise a digital image 150 as illustrated in FIG. 8 and may be used with a defect detection methodology illustrated in FIGS. 8-26 for detecting optical defects 162 in the digital image 150 in a manner described in greater detail below.

Referring to FIGS. 2-5, the optical defect detection system 10 may include a detection fixture 12 which may include a diffuser 48 that may be contoured or shaped complementary to the geometry of the transparency 104. The transparency 104 may be mounted on a transparency fixture 70 which may be positionable in alignment with an imaging recording device 22 such as a panoramic camera 24. The imaging recording device 22 may be configured to record detailed (i.e., high resolution) images of a viewing portion 122 of the transparency 104.

Figure 4:
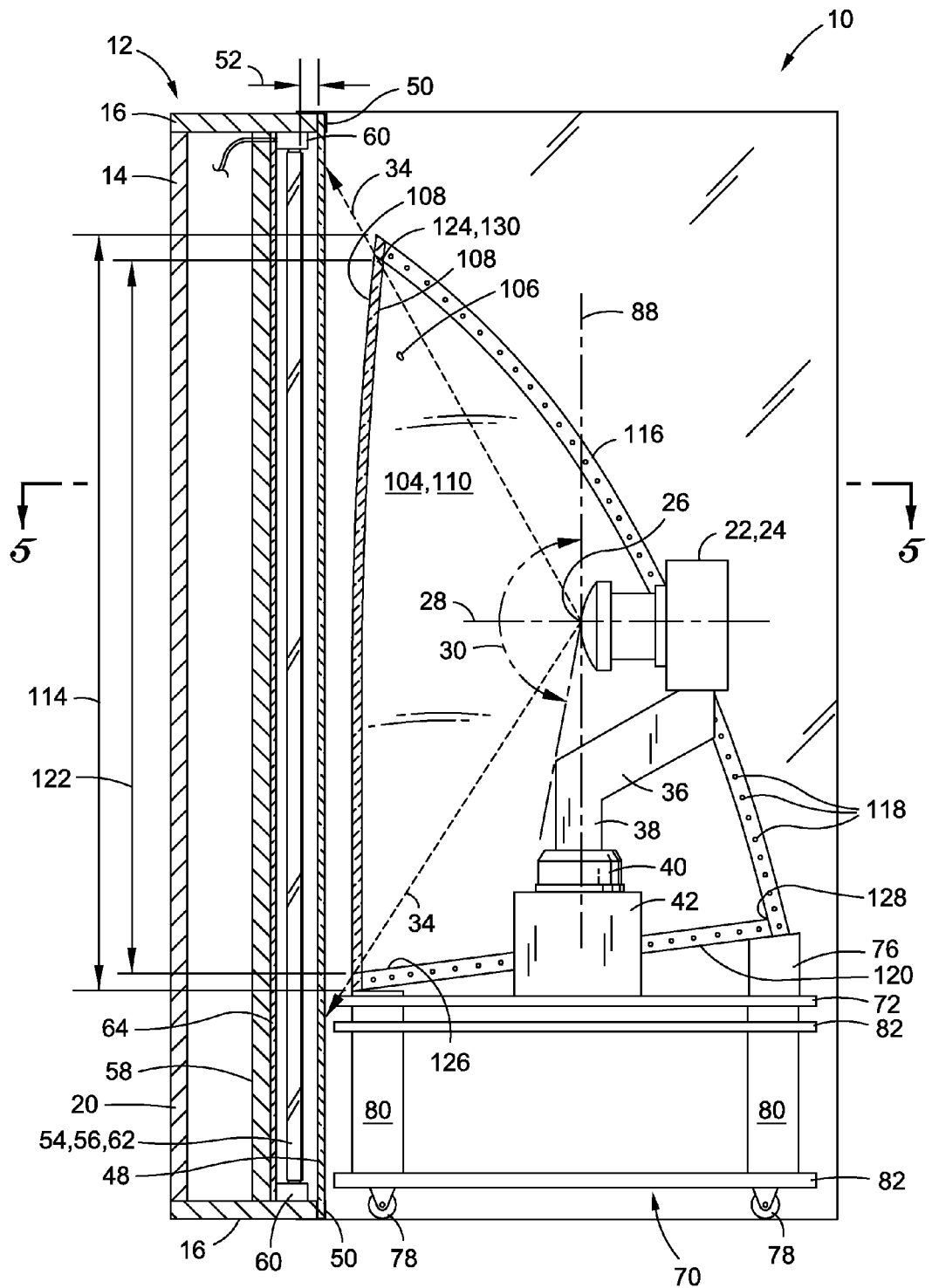
FIG. 4 is a side sectional illustration of the defect detection system.
Figure 5:
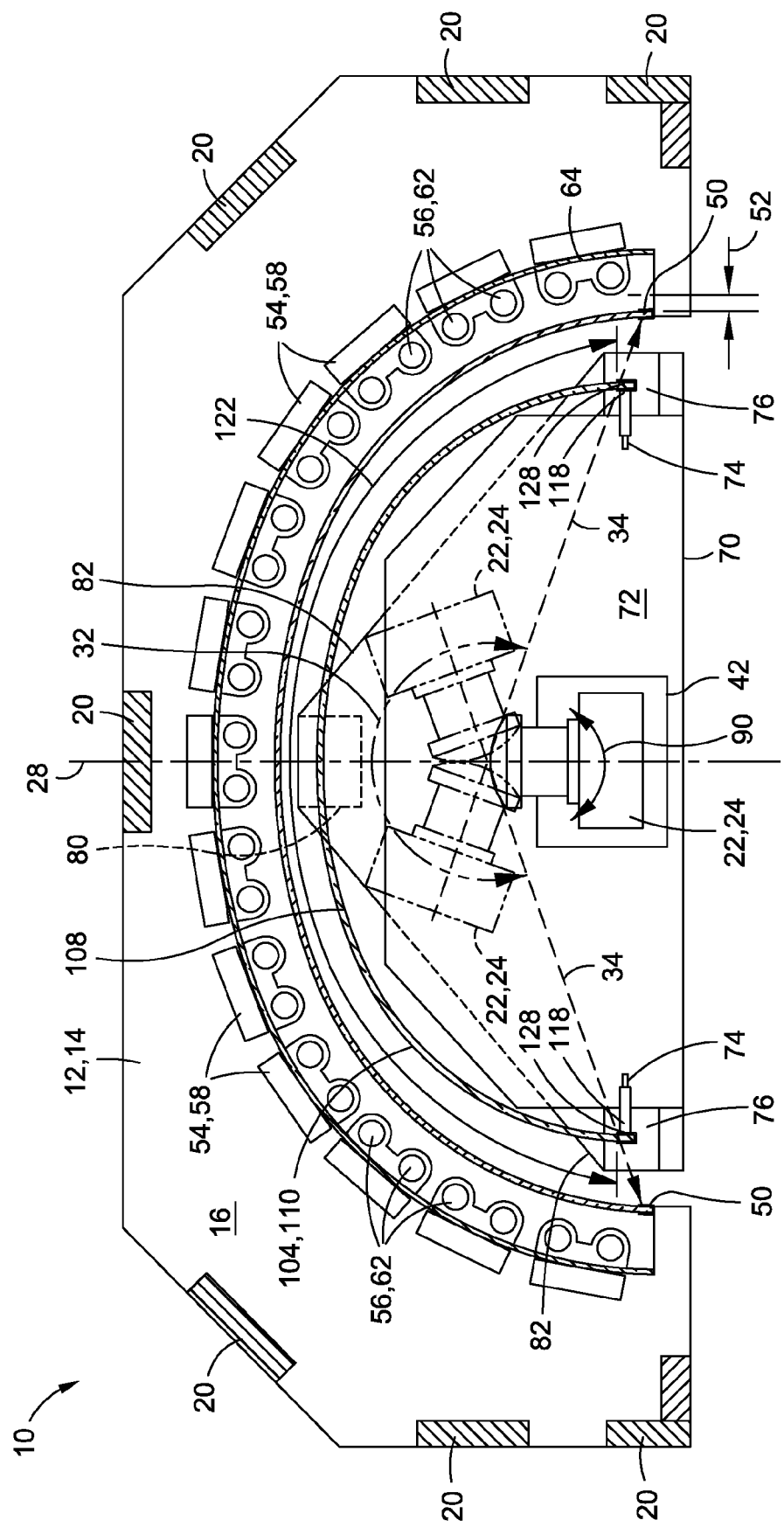
FIG. 5 is a top sectional illustration of the optical defect detection system taken along line 5-5 of FIG. 4 and illustrating the image recording device configured as a panoramic camera.

The transparencies 104 may comprise a transparent or relatively clear panel 16 as may be used in vehicular or non-vehicular applications. For example, FIG. 1 illustrates the aircraft 100 having several transparencies 104 for which the defect detection system 10 may be employed for recording images of the transparencies 104 in order to detect optical defects 106. The aircraft 100 shown in FIG. 1 includes a fuselage 102 having a cockpit with one or more transparencies 104 such as a canopy 112 or a windshield 110 at a forward end 132 of the aircraft 100. The windshield 110 transparency 104 may include a transparency frame 116 having an aft arch member 120 for supporting the transparency 104. The windshield 110 transparency 104 may include a viewing portion 122 through which a pilot may view objects external to the windshield 110. In this regard, the viewing portion 122 comprises the clear or transparent portion of the transparency 104 that is unblocked by the transparency frame 116 as shown in FIGS. 4-5.

The defect detection system 10 as disclosed herein provides a means for detecting optical defects 106 such as, without limitation, carbon particulates that may be embedded within a polycarbonate layer of the windshield 110. It should be noted that the aircraft 100 windshield 110 transparency 104 illustrated throughout the Figures and as described herein is not to be construed as limiting other types of transparencies 104 for which the defect detection system 10 may be used for detecting defects 106. In this regard, the defect detection system 10 may be employed for recording images and detecting optical defects 106 in a wide variety of transparencies 104 for a variety of different applications. For example, the defect detection system 10 may be used for recording images of transparencies 104 in any marine, land, air and/or space vehicle as well as for recording images in transparencies 104 used in non-vehicular applications including window panels or glazing materials used in buildings and structures and in other assemblies or systems such as instruments, lighting assemblies, lenses and in any glassware and/or plastic or polymeric compositions where detection of optical defects is desired.

Advantageously, the defect detection system 10 allows for inspection of transparencies 104 having a contoured or curved shape although transparencies 104 having a generally flat or planar configuration may be inspected using the defect detection system 10. For contoured or curved transparencies 104, the diffuser 48 and a light source 54 may be formed complementary to the contour of the transparency 104. For example, for the aircraft 100 windshield 110 and/or aircraft 100 canopy 112 having one or more curves as shown in FIG. 1, the diffuser 48 is preferably formed in a shape which mirrors the shape of the transparency 104 at a spaced distance from the transparency 104 such that the viewing portion 122 of the transparency 104 is substantially uniformly back lit by the combination of the light source 54 and the diffuser 48.

Referring generally to FIGS. 2-5, the light source 54 may be configured as an arrangement of one or more lighting elements 56 which may be configured to illuminate the diffuser 48. In this manner, light emitted by the light source 54 is substantially uniformly diffused or distributed throughout the diffuser 48 to provide uniformly-distributed background lighting behind the entire viewing portion 122 of the transparency 104. In addition, the light source 54 and diffuser 48 are preferably arranged such that the entirety of the viewing portion 122 is illuminated within the field of view of the image recording device 22. Optical defects 106 similar to that which are illustrated in exaggerated size in FIGS. 2-5 may be reliably detected by the defect detection system 10.

Referring briefly to FIGS. 4-5, the image recording device 22 may comprise a camera 24 such as the panoramic camera 24 mentioned above and which may include a wide-angle lens 26 (i.e., a fisheye lens) having a vertical field of view 30 that may encompass extreme upper and lower edges 124, 126 of the transparency 104 as illustrated by vectors 34 projecting or extending from the lens 26. However, the vertical field of view 30 of the image recording device 22 (i.e., of the lens 26) may be such that only a portion of the area between upper and lower edges 124, 126 is captured.

As indicated earlier, a vector 34 projecting or extending from the image recording device 22 represents a direction along which objects are viewed from the lens 26. A vector 34 that extends from the lens 26 falls within the angular field of view of the lens 26. By moving (e.g., translating, rotating) the image recording device 22 when recording images, the field of view may be increased. For example, by rotating the image recording device 22 about a vertical axis of rotation 88 while recording images, the horizontal field of view 32 is increased. Similarly, by rotating the image recording device 22 about a horizontal axis of rotation (not shown), the vertical field of view 30 may be increased. Rotation of the image recording device 22 about other axes is also contemplated. Translation of the image recording device 22 such as vertical or horizontal movement of the image recording device 22 results in a similar increase in the field of view.

The image recording device 22 may have a horizontal field of view 32 that encompasses opposing lateral sides of the transparency 104 such as the extreme lateral edges 128 on each lateral side of the transparency 104 as illustrated by the vectors 34. Toward this end, the image recording device 22 may be rotatable about the axis of rotation 88 to enable recording of the entirety of the viewing portion 122 between the opposing lateral edges 128 of the transparency 104. By rotating the image recording device 22 about the axis of rotation 88, the image recording device 22 provides a vertical field of view 30 and a horizontal field of view 32 to enable detection of optical defects 106 between and including the physical extremes of the transparency 104.

Figure 2:
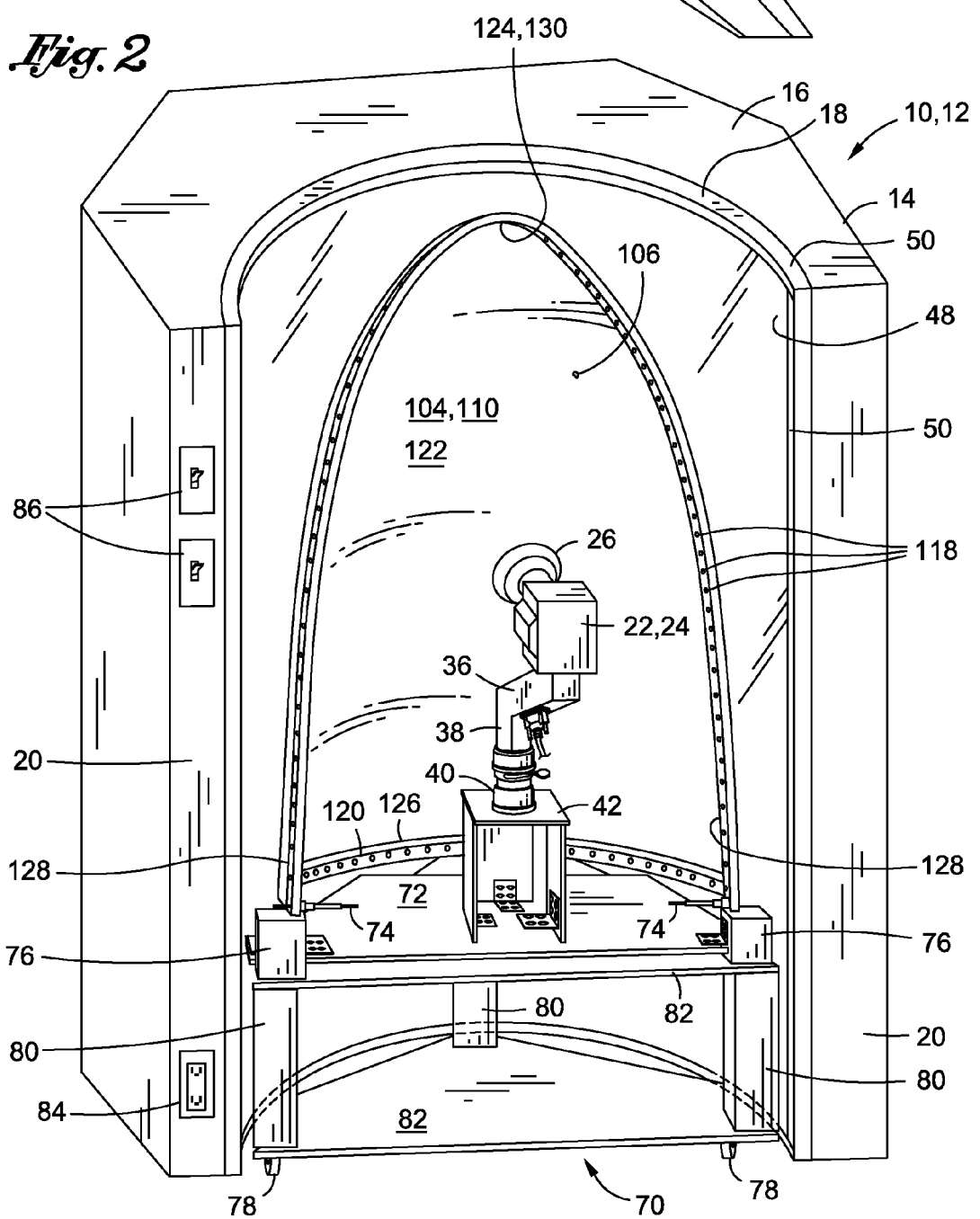
FIG. 2 is a perspective illustration of an embodiment of an optical defect detection system as may be used for recording a digital image of the transparency.
Figure 3:
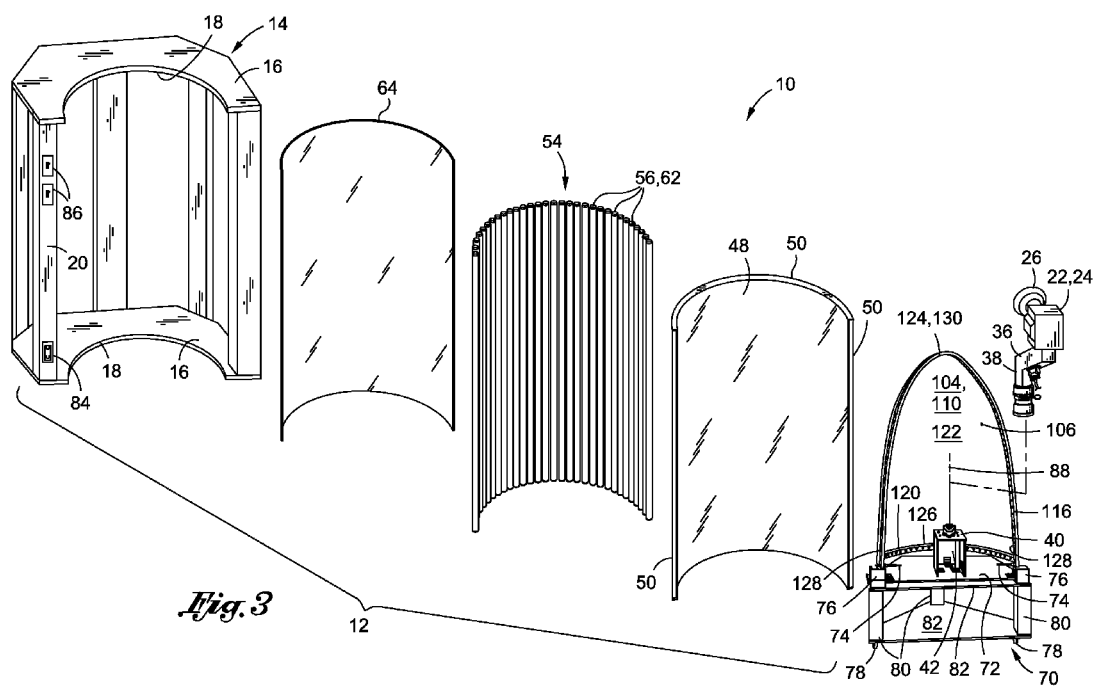
FIG. 3 is an exploded illustration of the defect detection system as shown in FIG. 2 and illustrating a transparency fixture to which an image recording device may be mounted.

Referring generally to FIGS. 2-5, shown is the optical defect detection system 10 comprising the light source 54, the diffuser 48 and the image recording device 22. The light source 54 is configured to emit light and, in this regard, may comprise any suitable illumination device capable of providing or emitting light for diffusion by the diffuser 48. For example, the light source 54 may be comprised of one or more incandescent and/or fluorescent lamps 62 or bulbs. As shown in FIG. 3, a plurality of fluorescent lighting elements 56 or fluorescent tubes may be arranged in an arcuate pattern and positioned in spaced, parallel relation to one another. However, the lighting elements 56 may be configured as any suitable device capable of emitting light without producing excessive heat that may otherwise damage the diffuser 48 and/or transparency 104.

Additionally, although incandescent bulbs and other light sources 54 such as light emitting diodes (LEDs) may be used for the light source 54, fluorescent tubes may be a preferred configuration due to their relatively high intensity or brightness (i.e., luminance), reduced heat output and extended operating life as compared to incandescent bulbs or lamps. Although shown in FIG. 3 as a plurality of elongate fluorescent lamps 62, the light source 54 may be fabricated or configured in a variety of alternative arrangements such as in an array of incandescent bulbs and/or LED's or as a combination of any other lighting elements 56 which may be provided as a single light source 54 or as a plurality of lighting elements 56.

Further in this regard, the light source 54 may be comprised of any suitable lighting element 56 configuration preferably emitting light of relatively high intensity with low heat output. Non-limiting examples of lighting element configurations include: xenon short-arc, mercury, tungsten photographic lamp, tungsten halogen, high-pressure sodium and any other suitable lighting element configuration. The image recording device may include a means to adjust the white balance of the image in consideration of the color temperature of the light and the color or tint of the light produced by the light source and in consideration of the natural hue of the transparency.

Referring to FIGS. 3-5, the fluorescent lamps 62 may be mounted in a plurality of light fixtures 58 arranged in a vertical orientation. The light fixtures 58 may be fixedly mounted to the housing 14 of the detection fixture 12. Each one of the lighting elements 56 (i.e., fluorescent lamps 62) may be equidistantly spaced along the contour of the diffuser 48 to provide a uniformly distributed light output to the diffuser 48. Each light fixture 58 may be configured to mount one or more (e.g., a pair) of the fluorescent lamps 62 in upper and lower lamp holders 60 of each light fixture 58. In an embodiment, the light fixtures 58 may be configured as 120/277 Volt fixtures for powering 85-watt fluorescent lamps 62 each having a capacity of 5,500 lumens of fluorescent lighting. However, fluorescent lamps 62 of any voltage, current draw or lumen capacity may be used. The uniformly-spaced fluorescent lamps 62 provide a uniform distribution of light to the diffuser 48 as a background for recording images of the transparency 104. However, as was indicated above, any configuration of lighting element 56 may be used for illuminating the diffuser 48.

Referring still to FIGS. 3-5, the defect detection system 10 may include a reflector 64 which may be positioned adjacent the light source 54. As shown in FIGS. 4-5, the reflector 64 may be positioned between the light fixtures 58 and the fluorescent lamps 62. In this arrangement, the reflector 64 is positioned on a side of the lighting element 56 opposite the diffuser 48 such that the reflector 64 reflects light emitted by the light source 54. The light is preferably reflected in a direction toward the diffuser 48 in order to maximize the total amount of light that is provided to the diffuser 48. In this regard, the reflector 64 facilitates homogenous illumination of the diffuser 48 wherein light is substantially uniformly distributed throughout the diffuser 48.

Furthermore, the reflector 64 serves the diffuser 48 by reflecting light in a manner that eliminates the occurrence of shadows, bright spots and/or hot spots in the diffuser 48. The reflector 64 may be fixedly or temporarily mounted to the housing 14 of the detection fixture 12. The reflector 64 may be positioned behind the light source 54 and may extend between upper and lower panels 16 of the housing 14 as best seen in FIG. 4. In one embodiment, the reflector 64 may be comprised of a sheet of metallic material fixedly mounted to the light fixtures 58 and/or formed to match the contour of the diffuser 48 and/or the arcuate shape of the light source 54 as shown in FIG. 3. In addition, the reflector 64 is preferably disposed in slightly spaced relationship to the lighting elements 56 to maximize the amount of reflected light that may be directed toward the diffuser 48. As may be appreciated, the reflector 64 may comprise any suitable reflecting material and may be configured in a variety of different arrangements including, but not limited to, a sheet of paper, plastic, metal or combinations thereof. In addition, the reflector 64 may be configured as a layer of paint in any suitable reflective color or finish. Furthermore, the reflector 64 may be simply comprised of a reflective coating or treatment applied to the light fixtures 58 and/or to a backing (not shown) disposed on a side 108 of the transparency 104 opposite the diffuser 48.

Referring still to FIGS. 3-5, shown is the diffuser 48 which is preferably interposed between the light source 54 and the transparency 104 and which may be contoured or shaped complementary to the transparency 104 to facilitate uniform backlighting thereof when viewed or imaged by the image recording device 22. Toward this end, the diffuser 48 may be fabricated of a suitable glass and/or polymeric material having a desired transmittance. The diffuser 48 may be heat treated in order to avoid fissures and/or cracks when forming the diffuser 48 into relatively small radii of curvature as may be required to conform to certain transparencies 104 having tight curvatures such as aircraft 100 canopies 112 and windshields 110 of small, high-speed aircraft. Heat treating the diffuser 48 prior to forming at the desired radius may also be necessary to prevent springback or creep of the diffuser 48 towards a flatter or larger radius.

Toward this end, the diffuser 48 may be provided with a diffuser frame 50 to maintain the curvature of the diffuser 48. The diffuser frame 50 may be of any construction including, but not limited to, metallic and/or polymeric construction although other materials may be used to form the diffuser frame 50 to maintain the curvature of the diffuser 48. In this regard, it is contemplated that the diffuser 48 may be fastened to cutouts 18 formed in each of the upper and lower panels 16 of the housing 14 in order to maintain the position and curvature of the diffuser 48.

Although shown as having a singly curved configuration, the diffuser 48 may be formed in a complex or contoured shape. For example, for inspecting a curved aircraft 100 canopy 112 such as that shown in FIG. 1, the diffuser 48 may be formed in a compound curved shape and, depending upon the minimum allowable bend radius for a given material composition and thickness, may require heat-treating to form the diffuser 48 into the small radii of the canopy 112.

The diffuser 48 may be configured as a sheet of material such as polymeric material capable of transmitting a desired percentage of light. For example, the diffuser 48 may be configured to transmit about 25-75% of the light such as the light that is emitted by the light source 54 and/or reflected by the reflector 64. In a further embodiment, the diffuser 48 may be configured to transmit at least about 50% of the light emitted by the light source 54 and/or reflected by the reflector 64. However, the diffuser 48 may be configured to transmit any amount of light.

Regarding material for the diffuser 48, a thermoplastic transparent sheet of material such as acrylic may be used although other polymeric compositions including, but not limited to, polycarbonate materials may be used. Even further, it is contemplated that the diffuser 48 may be fabricated of glass having the appropriate diffusion properties for uniformly distributing light throughout the area of the diffuser 48. However, polymeric compositions may be preferred due to the relative ease of forming polymeric sheets into complex or contoured shapes. In this regard, the diffuser 48 may be fabricated or constructed of material providing any suitable range of light transmittance which is preferably sufficient to uniformly illuminate the viewing portion 122 of the transparency 104 yet which also eliminates the occurrence of bright spots in the diffuser 48.

In one embodiment, the diffuser 48 may be configured as a sheet of Plexiglas having a thickness ranging from approximately 0.030 to 0.25 inch although any thickness may be used. In general, the thickness of the sheet is preferably kept to a minimum to reduce bending stresses in the diffuser 48 when forming to a contour and to minimize the amount of heat treatment of the diffuser 48 that may be necessary to reduce or remove residual stresses that may otherwise tend to spring the diffuser 48 back toward its initially planar or flat shape. For example, the diffuser 48 may be provided as a 0.063 inch thick sheet of material having sufficient light transmittance while minimizing the extent of heat treatment required to form the diffuser 48 in a contoured shape. However, availability and/or cost may dictate a greater material thickness such as, for example, 0.118 inch thick Plexiglas sheet which may be provided as a length and width extending continuously between the upper and lower panels 16 and between the opposing sides of the housing 14 to avoid discontinuities or interruptions in the illuminated background of the transparency 104. In the illustrated embodiment wherein the transparency 104 comprises the aircraft 100 windshield 110, the diffuser 48 may be provided as a sheet of Plexiglas having a thickness of 0.118 inch and a suitable length and width (e.g., 6 feet by 8 feet) to provide a continuous background for the transparency 104. The Plexiglas may have a visible light transmittance capability of 50% although the diffuser 48 may be constructed of any material providing any degree of light transmittance.

Referring to FIGS. 4-5, shown is the diffuser 48 which may be fixedly mounted to the housing 14 and is preferably disposed in spaced relation to the light source 54 indicated by diffuser gap 52. In this regard, the diffuser 48 is preferably spaced away from the light source 54 to avoid excessive heating which could damage the diffuser 48 and/or the transparency 104. Furthermore, spacing the diffuser 48 away from the light source 54 may eliminate the occurrence of bright spots in the diffuser 48. In one embodiment, the diffuser 48 may be spaced away from the light source 54 at a diffuser gap 52 of approximately 1 inch although the diffuser 48 and the light source 54 may be spaced at diffuser gaps 52 of any size.

Referring to FIGS. 2, 3 and 5, shown is the housing 14 which may comprise one or more vertical frame members 20 interconnecting the upper and lower panels 16. The housing 14 may be configured for mounting the light source 54, the diffuser 48 and/or the reflector 64 in fixed or adjustable relation to one another. In an embodiment of the housing 14, upper and lower ends of the light fixtures 58 may be mounted to the panels 16 such as by mechanical fastening, bonding or other suitable means. Likewise, the reflector 64 and/or the diffuser 48 may be mounted to the panels 16 along the cutouts 18 formed in the panels 16 as best seen in FIG. 3. The housing 14 may be configured as a partially enclosed configuration in order to enable access to the interior of the housing 14 such as for access to the light fixtures 58 or electrical wiring for providing power from a power source (not shown) to the light fixtures 58. Wiring may also be provided to deliver electrical power to the image recording device 22 and/or to a processor or controller such as a personal computer or a laptop as may be used for controlling the image recording device 22.

The housing 14 may optionally include one or more power outlets 84 for providing power to auxiliary components. Additionally, one or more switches 86 may be included on an exterior portion of the housing 14 for activating the light source 54 and/or for activating or providing power to the image recording device 22. For example, the detection fixture 12 may include the pair of switches 86 mounted on the housing 14 for activating different portions of the lighting elements 56. One switch 86 may be adapted for activating the lighting elements 56 on the left side of the housing 14 while the other light switch 86 may be adapted to activate the lighting elements 56 on the right side of the housing 14.

Although shown as having a generally orthogonal shape with cutouts 18 in the upper and lower panels 16, the housing 14 may be configured in a variety of alternative configurations and is not limited to the arrangement shown. For example, it is contemplated that the housing 14 may be fabricated as a semi-monocoque structure or as an arrangement of tubular elements for mounting the lighting elements 56, reflector 64 and/or diffuser 48. In addition, it is also contemplated that the housing 14 may be fitted with wheels 78 in order to facilitate transportability to different locations such as in an assembly or maintenance facility.

Referring still to FIGS. 2-5, shown is the transparency fixture 70 for mounting the transparency 104 and the image recording device 22 in fixed relation to one another. The transparency fixture 70 may be positioned relative to the diffuser 48 such that any point on the entirety of the viewing portion 122, when viewed through the image recording device 22, has the diffuser 48 in the background. More specifically, the image recording device 22, the transparency 104 and the diffuser 48 are configured and/or positioned such that a vector 34 extending from the image recording device 22 and passing through any point in the viewing portion 122 may intersect or strike the diffuser 48.

Due to the homogeneous illumination of the diffuser 48, the defect detection system 10 is adapted to facilitate the recording of detailed photographic and/or videographic images of the viewing portion 122 of the transparency 104. Background lighting of the transparency 104 by means of the homogenously illuminated diffuser 48 facilitates illumination of relatively small defects 106 which may otherwise be invisible to laser-driven mechanisms. Furthermore, the transparency fixture 70 preferably positions the image recording device 22 such that the lens 26 may capture detailed images at the extreme upper and lower edges 124, 126 of the transparency 104 as well as detailed images at the opposing lateral edges 128 of the transparency 104. For example, in the aircraft 100 windshield 110 illustrated in FIG. 2, the nose 130 of the windshield 110 defines the upper edge 124 and the arch member 120 defines the lower edge 126 of the windshield 110. The extreme opposing lateral edges 128 are likewise defined by intersections of the arch member 120 with the transparency frame 116.

Although the transparency 104 is illustrated as an aircraft 100 windshield 110, the defect detection system 10 as disclosed herein may be adapted for detecting optical defects 106 in any transparency 104 of any size, shape and configuration. Furthermore, the defect detection system 10 as disclosed herein is not limited to inspection of transparencies 104 having a contoured or curved shape. For example, it is contemplated that the defect detection system 10 and, more particularly, the diffuser 48 may be adapted to facilitate optical inspection of generally planar, flat or slightly curved transparencies 104 such that the diffuser 48 may be provided in a planar shape. Likewise, for planar transparencies 104, the reflector 64 and/or light source 54 may also be configured complementary to the diffuser 48. Furthermore, although the detection fixture 12 illustrates the transparency 104 as being mounted in relation to the image recording device 22, it is contemplated that the image recording device 22 may be mounted to the housing 14. Likewise, the detection fixture 12 may be altogether eliminated and the transparency 104 may be simply positioned in relation to the diffuser 48 and image recording device 22 such that any vector 34 passing through the lens 26 of the image recording device 22 and extending through the viewing portion 122 of the transparency 104 strikes or intersects the diffuser 48. In this regard, the vectors 34 as shown in FIGS. 4 and 5 represent the extent of what is visible through a given lens having a given field of view.

Referring to FIG. 4, the transparency fixture 70 may be configured such that the image recording device 22 may be mounted on a camera mount 42. The image recording device 22 may be positioned such that an optical axis 28 of the lens 26 is located approximately midway along a height 114 of the transparency 104 in order to facilitate inspection of extreme upper and lower edges 124, 126 of the viewing portion 122 with sufficient resolution. In this regard, the image recording device 22 is preferably provided with a vertical field of view 30 that encompasses the upper and lower edges 124, 126. As can be seen in FIG. 4, the vectors 34 extending from the lens 26 and passing through the upper and lower edges 124, 126 of the viewing portion 122 intersect the diffuser 48. As may be appreciated, the area of the transparency 104 that is intersected by the horizontally-oriented optical axis 28 may be imaged with an optimal level of resolution as compared to the remainder of the transparency 104. The vertical field of view 30 for the image recording device 22 as shown in FIG. 4 is indicated as being approximately 175° due to interference with an offset arm 36 and vertical arm 38 which collectively support the image recording device 22. However, the vertical field of view 30 may extend through 180° although the image recording device 22 may define other values for the field of view.

Referring to FIG. 5, the image recording device 22 also defines a horizontal field of view 32 which, depending upon the focal length of the lens 26, may extend through 180° or larger. However, rotation of the image recording device 22 about the axis of rotation 88 along a direction of rotation 90 increases the horizontal field of view 32 up to 360° and slightly beyond depending upon the rotational capability of the image recording device 22. For the transparency 104 configuration shown in FIG. 5, total rotation of the image recording device 22 along the direction of rotation 90 may be limited to 225°. Such limited rotation of the image recording device 22 in combination with a static 180° field of view of a suitable fisheye lens 26 may be sufficient to capture an entirety of the viewing portion 122 which extends between the transparency frame 116 on opposite sides of the transparency 104. With a rotation of 360°, the image recording device 22 would provide an essentially spherical field of view.

The image recording device 22 may also be adapted to be translated in order to image a desired object. For example, the image recording device 22 may be adapted to be moved vertically, horizontally, diagonally or any combination thereof in order to record images of an object such as a transparency 104. Likewise, the image recording device 22 may be adapted to be translated in combination with rotation in order to facilitate imaging of an object such as a transparency 104. In this regard, the image recording device 22 may be adapted to be moved in any manner including rotation, translation, tilt and roll and any other movement or combination of movements during imaging of a transparency 104 of other object. For example, for imaging an object of relatively large height but narrow width, the image recording device 22 may be adapted to be translated vertically such as from a bottom of the object to a top of the object during high-speed imaging of the object. For a relatively flat object having relatively large width but small height, the image recording device 22 may be adapted to be translated horizontally from one end to an opposite end of the object during high-speed imaging thereof. Furthermore, for objects that fall outside the maximum field of view of the lens 26, a combination of incremental imaging steps may be required to capture the entirety of the object following by post-processing to stitch together the multiple images to create a single panoramic image.

The image recording device 22 may be configured as any device of sufficiently high resolution and which may be rotatable about an axis. For example, the image recording device 22 may be configured as a panoramic camera 24 such as that which is commercially available from Panoscan, Inc. of Van Nuys, Calif. and which is commercially known as the Panoscan MK-3 camera. When fitted with a wide-angle lens 26, the image recording device 22 may be capable of recording a 360° panoramic image of the transparency 104. Detection of the optical defects 106 such as carbon particulates may be pinpointed on a pixel-by-pixel basis when the image is compared to a baseline image known to be devoid of such defects 106. A defect-free baseline image may be recorded by scanning the diffuser 48 with an image recording device 22 having the same lens 26 and using the same light source 54, diffuser 48 and/or reflector 64 setup that is used to record images of a transparency 104. Stored or real-time baseline images can be compared on a pixel-by-pixel basis to stored or real-time images of the inspected transparency 104 in order to detect and record the location and size of potential optical defects 106.

The image recording device 22 may comprise any suitable still camera 24 or video camera 24 and any digital or analog camera 24 and may be fitted with any lens 26 of any focal length. Furthermore, the image recording device 22 is not limited to being mounted on a rotatable base 40 but may be configured as a plurality of cameras 24 to collectively record images of a transparency 104 or of other objects. Even further, the image recording device 22 is preferably positioned such that the optical axis 28 is positioned approximately midway along a height 114 of the transparency 104 between the upper edge 124 and lower edge 126 (i.e., from the nose 130 to the arch member 120). However, the image recording device 22 may also be height-adjustable to allow for scanning of transparencies 104 and other objects that may be larger than that which can be encompassed by the vertical field of view 30 of the lens 26. For example, the image recording device 22 may be positionable at an upper position and at a lower position (not shown) to allow for recording of a panoramic image of an upper portion of the transparency 104 followed by panoramic imaging of a lower portion of the transparency 104 after which the transparency 104 images can be combined by stitching together the images recorded at each location. The ability to adjust the height of the image recording device 22 may increase the resolution of the transparency 104 images at upper and lower locations thereof.

Referring still to FIGS. 4-5, the image recording device 22 may be mounted to the transparency fixture 70 by means of the camera mount 42 illustrated in the Figures as being mounted on a mounting plate 72. A base 40 of the image recording device 22 may include a motorized mechanism for facilitating rotation of the image recording device 22 about the axis of rotation 88. As was earlier indicated, the image recording device 22 may be mounted such that the optical center of the lens 26 is coincident with the axis of rotation 88 as shown in FIG. 5 such that, during rotation of the image recording device 22 about the axis of rotation 88, the optical center is essentially stationary. However, the image recording device 22 may be configured such that the optical center rotates during rotation of the image recording device 22.

In an embodiment, the image recording device 22 preferably has a resolution sufficient to record defects 106 having a width of at least as small as about 0.010 inch over an entirety of the viewing portion 122 of the transparency 104. For example, the camera 24 may have a vertical resolution of up to at least about 9,000 pixels and a horizontal resolution of up to at least about 65,000 pixels depending upon the angular rotation of the camera 24. However, the image recording device 22 may be provided in any resolution capability sufficient to record defects 106 of a given size. Ideally, the image recording device 22 is configured as a digital camera 24 in order to allow for the generation of digital records of defect 106 size and location as well as the ability to identify defects 106 having sizes as small as at least about 0.030 inch and more preferably at least as small as about 0.010 inch or smaller. For example, the image recording device 22 may have a resolution sufficient to record defects 106 as small as 0.005 inch or smaller. Additionally, the camera 24 is preferably provided as a high-speed digital camera 24 to reduce the amount of time required to scan and record images of large transparencies 104. Advantageously, the defect detection system 10 facilitates illumination and detection of defects 106 which may otherwise be invisible to laser-driven mechanisms for defect 106 recording. Furthermore, the contouring or shaping of the diffuser 48 complementary to the contour of the transparency 104 facilitates reliable, accurate detection of relatively small optical defects 106 along and between the extreme upper and lower edges 124, 126 and along and between the opposing lateral edges 128 of the transparency 104.

Referring still to FIGS. 4-5, the transparency fixture 70 is configured for supporting the transparency 104 such that the transparency 104 is generally vertically-oriented in order to equalize the distance from the camera 24 to the transparency 104 at the upper and lower edges 124, 126. In this manner, the upper and lower edges 124, 126 of the viewing portion 122 may be imaged with generally equivalent levels of resolution. Ideally, the transparency 104 is also preferably mounted on the transparency fixture 70 such that the transparency 104 is generally oriented in parallel relation to or in alignment with the diffuser 48 such that the viewing portion 122 of the transparency 104 is generally homogenously or substantially uniformly illuminated by the diffuser 48.

As indicated above, the positioning of the transparency 104 relative to the camera 24 and diffuser 48 is preferably, but optionally, such that for any vector 34 that projects or extends from the lens 26 and then passes through any location of the viewing portion 122 of the transparency 104, the vector 34 will strike or intersect the diffuser 48. Toward this end, the transparency 104 may be mounted on a pair of shim blocks 76 or other suitable height-adjustable mechanism in order to facilitate a generally vertical orientation of the transparency 104. The transparency 104 may be fixedly secured to the transparency fixture 70 using temporary mechanical fasteners 74 inserted through transparency mounting holes 118 and into the transparency frame 116. Although the transparency 104 is illustrated in FIG. 5 as being secured to the transparency fixture 70 by a pair of temporary mechanical fasteners 74 such as Cleco fasteners, any number of mechanical fasteners 74 and associated bracketry may be provided in order to fixedly secure the transparency 104 to prevent movement during inspection. For example, a third mechanical fastener 74 may be extended through one or more transparency mounting holes 118 in the arch member 120 at the crest of the transparency 104 as best seen in FIG. 4. However, the transparency 104 may be supported on the transparency fixture 70 without the aid of mechanical or other attachment means.

The transparency fixture 70 is illustrated as comprising a set of vertical frames 80 interconnecting a set of horizontally oriented horizontal panels 82. However, the transparency fixture 70 may be configured in a variety of alternative arrangements suitable for fixedly securing the image recording device 22 and the transparency 104 to the transparency fixture 70. Additionally, the transparency fixture 70 may be fitted with wheels 78 or other mechanism to facilitate movement of the transparency 104 relative to the detection fixture 12. However, as was indicated above, the transparency 104 may be mounted to the detection fixture 12 such that the transparency fixture 70 may be omitted.

It should also be noted that although the transparency fixture 70 illustrates the transparency 104 in a nose-up configuration, the transparency 104 may be oriented in any alternative orientation sufficient to allow imaging of the transparency 104 by the image recording device 22. Furthermore, the defect detection system 10 may be configured in any arrangement wherein the digital camera 24 may record images of the transparency 104 by means of rotation about a vertically-oriented axis of rotation 88 and/or about a horizontally-oriented axis of rotation or about axes oriented in other directions. Furthermore, the defect detection system 10 is not to be construed to be limited to inspecting a single transparency 104 at one time but may be configured to inspect multiple (i.e., two or more) transparencies 104 or other objects during a single imaging operation. Although described above with reference to inspecting transparencies 104, it is also contemplated that the defect detection system 10 may be employed for inspecting non-transparent objects or objects through which visible light is not passable. In this regard, the image recording device 22 may be employed to record panoramic images of objects having a curved shape.

Figure 6:
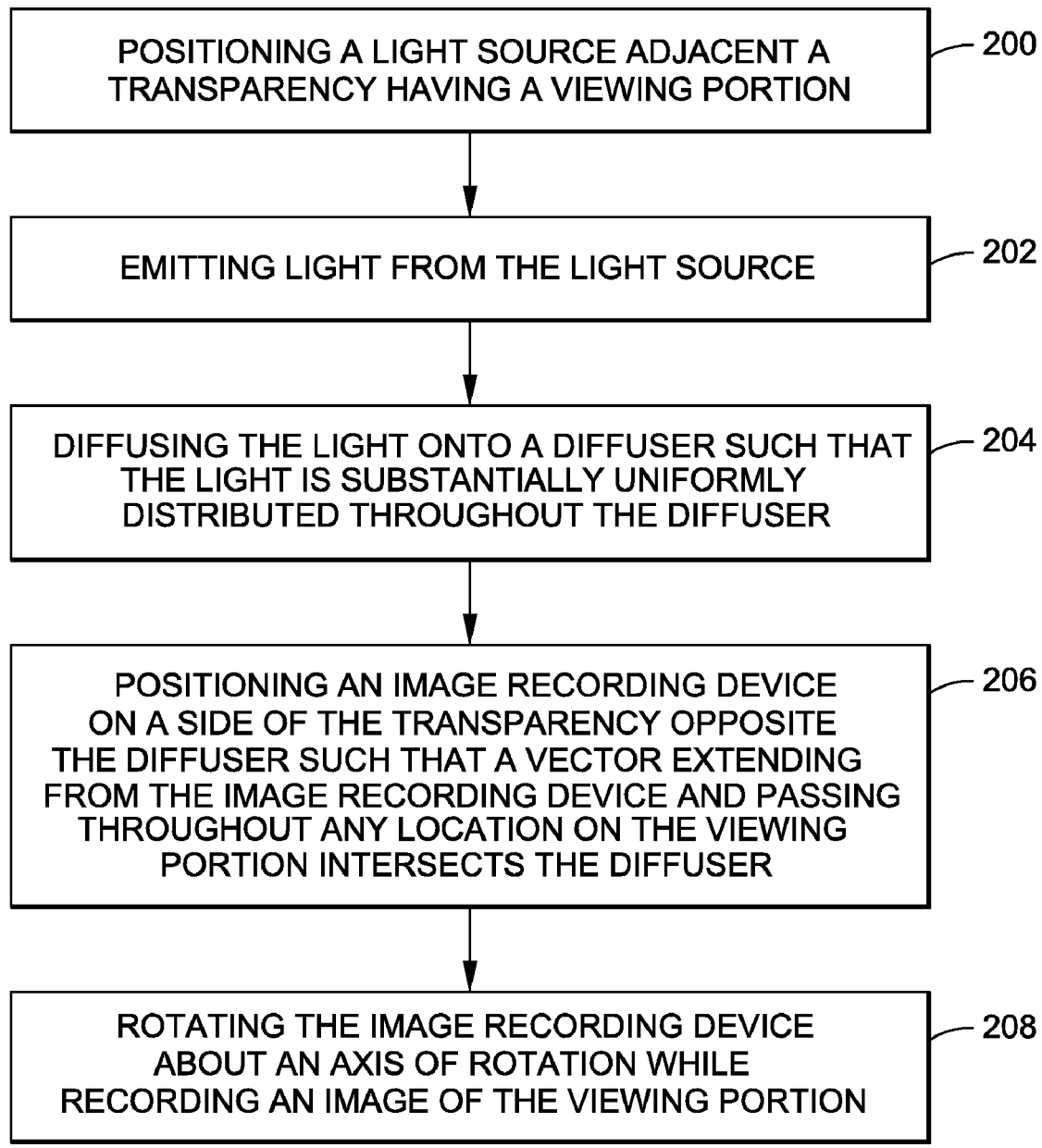
FIG. 6 is a flow chart illustrating a methodology of recording an image of the transparency.

Referring to the flow chart illustrated in FIG. 6 and with additional reference to FIGS. 1-5, shown is a methodology of recording an image of the transparency 104. As indicated above, the transparency 104 may include a viewing portion 122 bounded by the transparency frame 116. The method may comprise step 200 including positioning the light source 54 adjacent the transparency 104. As was earlier indicated, the light source 54 may be configured in a variety of alternative arrangements including, but not limited to, an arcuately-arranged set of fluorescent lamps 62 oriented in spaced, parallel relation to one another. The light source 54 may be located in spaced arrangement relative to the transparency 104 to avoid excessive radiative heating of the transparency 104.

Step 202 may comprise emitting light from the light source 54 such that the light is incident upon the diffuser 48. A reflector 64 may be included behind the light source 54 as shown in FIGS. 3-5 in order to increase the amount and/or intensity of light that is incident upon the diffuser 48. As indicated above, the reflector 64 is preferably configured to reflect or redirect the light onto the diffuser 48 in such a manner as to avoid shadows or non-uniform illumination of the diffuser 48 and to provide an evenly lit background against which the transparency 104 may be imaged by the image recording device 22. In order to avoid excess heat buildup in the diffuser 48, the diffuser 48 may be positioned at a spaced distance away from the light source 54 as defined by diffuser gap 52 shown in FIGS. 4-5. The spacing of the diffuser 48 from the light source 54 further facilitates a substantially homogenous illumination of the diffuser 48 by eliminating shadows, hot spots and/or bright spots in the diffuser 48.

Step 204 comprises diffusing the light onto the diffuser 48 such that the light is substantially uniformly diffused or distributed throughout the diffuser 48 for uniform imaging of the transparency 104. In a preferable but optional embodiment, the diffuser 48 may be configured to transmit about 50% of the light that is emitted by the light source 54 although the diffuser 48 may be configured to transmit any amount of light that sufficiently illuminates or backlights the transparency 104. The diffuser 48 may be formed of a variety of different materials without limitation including polymeric materials such as acrylic or Plexiglas sheet although any material may be used. The material is preferably selected to provide the desired light transmission characteristics. The diffuser 48 may optionally be formed as a combination of materials or as an assembly that is configured to provide a uniformly-illuminated background for viewing the transparency 104.

Step 206 comprises positioning the image recording device 22 on a side 108 of the transparency 104 that is opposite from the diffuser 48 such that a vector 34 passing through any portion of the viewing portion 122 will intersect or strike the diffuser 48 as shown in FIGS. 4-5. In this regard, the diffuser 48 is preferably contoured complementary to the contour of the transparency 104 such that the entirety of the viewing portion 122 is uniformly backlit by the diffuser 48. Likewise, the light source 54 and/or the reflector 64 are preferably arranged such that any area of the viewing portion 122 that is viewable through the lens 26 will be backlit by a uniformly-illuminated area of the diffuser 48 including backlighting by the perimeter edges of the diffuser 48. Toward this end, the diffuser 48 may be of a larger size than the transparency 104.

The method of recording the image of the transparency 104 may comprise positioning the image recording device 22 at a suitable location to maximize the resolution at all areas of the transparency 104. For example, the image recording device 22 may be positioned midway along a height 114 of the transparency 104 to equalize the resolution at upper and lower edges 124, 126. The image recording device 22 may be positioned at a location that equalizes the resolution at lateral edges 128 of the transparency 104. The image recording device 22 is preferably positioned such that at least a part of the viewing portion 122 may be captured within the field of view 30, 32 of the lens 26 when the image recording device 22 is stationary. For relatively large transparencies 104 having areas that normally fall outside of the field of view 30, 32 (i.e., when the camera 24 is stationary), imaging of the entirety of the viewing portion 122 may require moving the image recording device 22 while recording images. For the example of the transparency 104 shown in FIG. 4, the upper and lower edges 124, 126 of the viewing portion 122 fall within the vertical field of view 30 of the image recording device 22.

However, as shown in FIG. 5, the lateral edges 128 of the viewing portion 122 fall outside of the field of view 30, 32 (i.e., when the camera 24 is stationary) and therefore, movement of the image recording device 22 is required in order to image the entirety of the viewing portion 122 from one lateral edge 128 to the opposite lateral edge 128. For contoured or curved transparencies 104, step 208 may comprise rotating the image recording device 22 about the axis of rotation 88 while recording images of the viewing portion 122 as shown in FIG. 5. However, the image recording device 22 may be moved in any suitable manner in order to image the entirety of the viewing portion 122. Movement of the image recording device 22 may comprise translation, rotation, roll, tilt or other movements and combinations thereof. Movement of the image recording device 22 may further comprise rotation of the image recording device 22 about at least one axis of rotation such as the axis of rotation 88 illustrated in FIG. 4 which is shown as a vertical axis of rotation 88. However, the image recording device 22 may be rotated about other axes of rotation. In addition, the image recording device 22 may be translated (e.g., moved vertically, horizontally, laterally, etc.) or may be translated in combination with rotational movement while recording images. As mentioned earlier, multiple images of different areas of the transparency 104 may be stitched together or otherwise assembled to create a single composite or panoramic image of the transparency 104.

As indicated above, the diffuser 48 may have a contour that is preferably, but optionally, formed complementary to the contour of the transparency 104. The image recording device 22 is preferably positioned in relation to the transparency 104 and the diffuser 48 such that rotation of the image recording device 22 about the axis of rotation 88 allows for minimal variation in the distance from the lens 26 to the transparency 104 between upper and lower edges 124, 126 such that the quality of the image (i.e., the resolution) is generally equal at the upper and lower edges 124, 126. Likewise, the image recording device 22 is preferably positioned in relation to the transparency 104 such that the resolution at the opposing lateral edges 128 is generally equal. However, it is contemplated that the image recording device 22 may be positioned in relation to the transparency 104 such that resolution is greater at certain areas of the transparency 104 as compared to other areas. The optical defect detection system 10 is preferably arranged to allow for recording of defects having a width at least as small as about 0.010 inch or smaller over an entirety of the viewing portion 122 of the transparency 104. Toward this end, the image recording device 22 may be configured as a digital camera 24 such that digital records of the defect 106 may be located and documented.

Figure 27A:
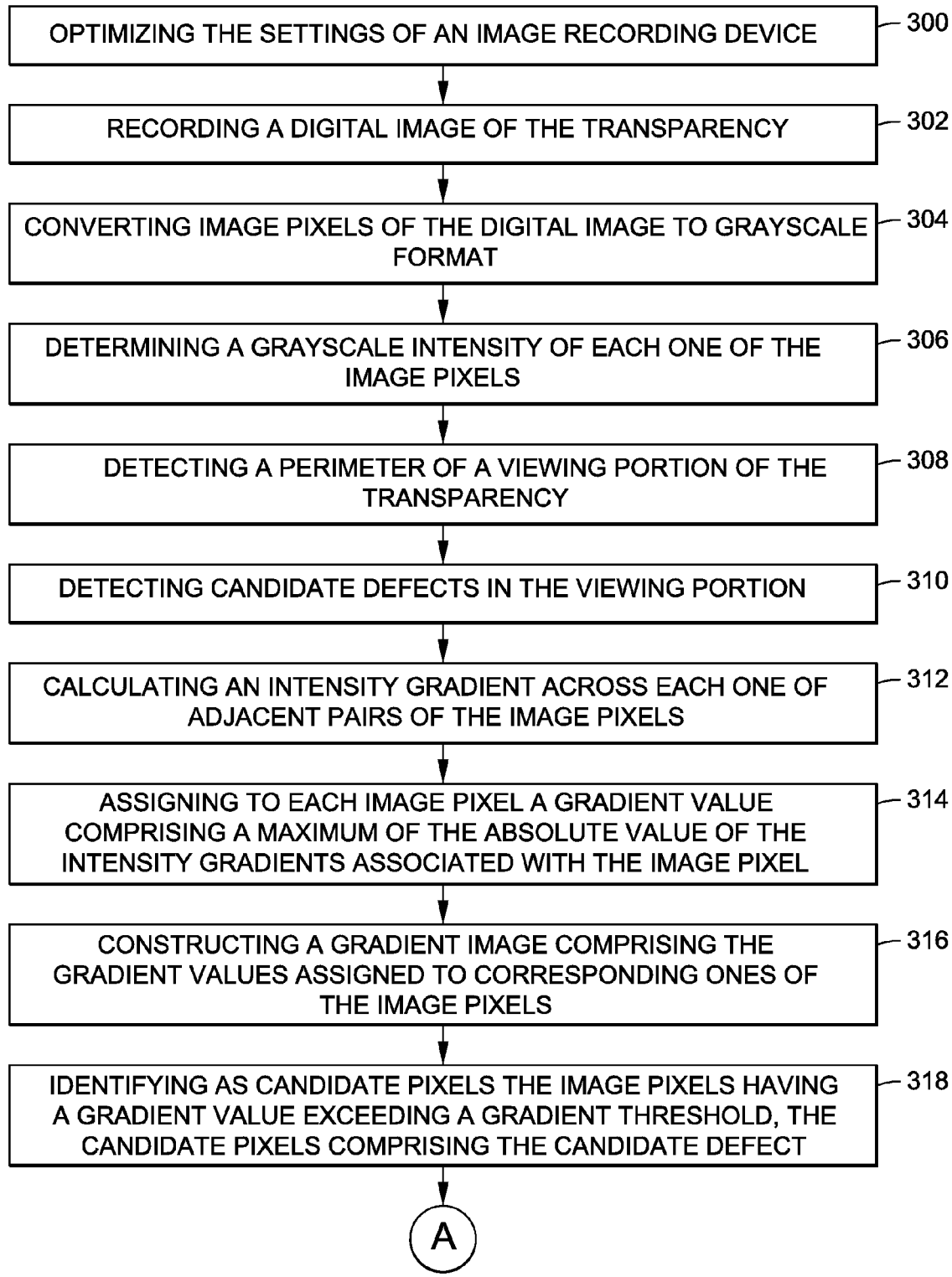
FIGS. 27A-27B collectively illustrates a flow chart of an embodiment of a methodology of detecting optical defects in the transparency.
Figure 27B:
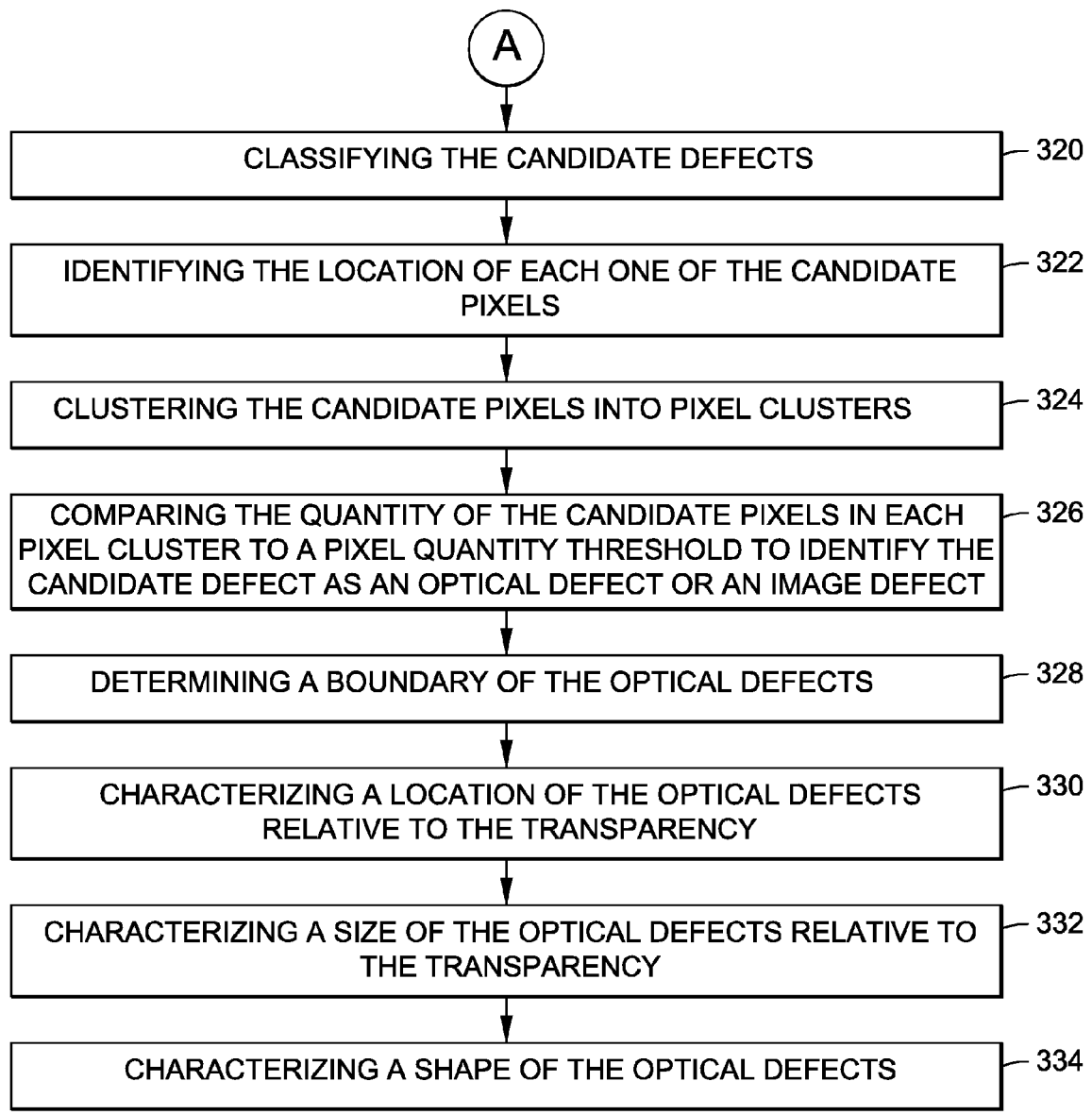

Referring to FIGS. 27A-27B and with additional reference to FIGS. 7-26C, disclosed is a methodology for detecting optical defects 162 in a transparency 104. As was earlier indicated, the transparency 104 includes the viewing portion 122 which may comprise the clear or transparent portion of the transparency 104 that is generally unblocked by the transparency frame 116 and/or arch member 120 as shown in FIGS. 4-5. Advantageously, the disclosed methodology provides a process for analyzing an image file of the transparency 104 on a pixel-by-pixel basis and detecting a variety of opaque and/or translucent defects or matter in the transparency 104 including, without limitation, carbon particulate defects that may be embedded within the transparency 104. Furthermore, the methodology disclosed herein provides a means for generating detailed information regarding the size, shape and/or location of such optical defects 162 within the transparency 104. Furthermore, the present disclosure describes an automated methodology for scanning the image file of the transparency 104 for candidate defects 160 under optimal imaging settings in order to provide a means for detecting and classifying such optical defects 162.

Figure 7:
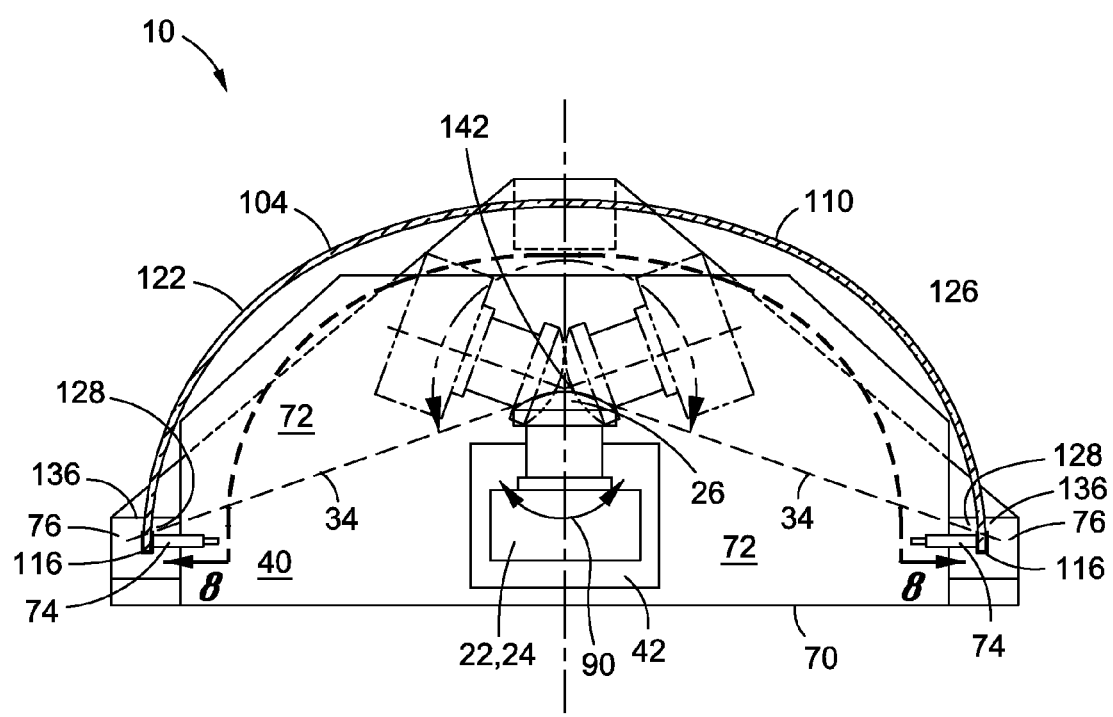
FIG. 7 is a sectional illustration of the optical defect detection system omitting the diffuser, light source, reflector and housing and illustrating the relative positioning of the transparency and the image recording device.

Referring to FIGS. 27A-27B, step 300 of the methodology may initially comprise optimizing the settings of the image recording device 22 (FIG. 7) in relation to the transparency 104 to be imaged. For example, camera settings such as the F setting (i.e., f-stop), the ISO setting (i.e., film speed), and the color settings (i.e., red, green, blue) may be adjusted depending upon the hue of the transparency 104 (FIG. 7). The F setting may be adjusted to control the amount of light that reaches the camera 24 sensor. For example, the above-mentioned panoramic camera 24 available from Panoscan, Inc. may be adjusted such that the F setting is equivalent to 30 in order to permit sufficient light to enable detection of defects within the transparency 104.

Likewise, the ISO setting or film speed may be adjusted in accordance with the transparency 104 to be imaged and the lighting environment. The ISO setting may be adjusted to be less than approximately 400 to compensate for the natural average hue of the transparency 104 although the ISO setting may be adjusted to any value. Likewise, the color setting for each one of the red (R), green (G) and blue (B) colors may be adjusted in accordance with the hue of the transparency 104. Settings may vary depending upon the composition of the transparency 104. For example, an aircraft 100 windshield 110 may be comprised of multiple plies of acrylic, polyurethane, polycarbonate and one or more coatings, all of which affect the settings of the image recording device 22.

Referring still to FIGS. 27A-27B, step 302 may comprise recording the digital image 150 of the transparency 104. FIG. 6 illustrates a methodology for recording the digital image 150 of the transparency 104 as described in greater detail above. The resulting digital image 150 file may be recorded by scanning the image recording device 22 illustrated in FIGS. 2-5 in a manner as illustrated in FIG. 7 in order to generate the digital image 150 illustrated in FIG. 8.

Figure 10:
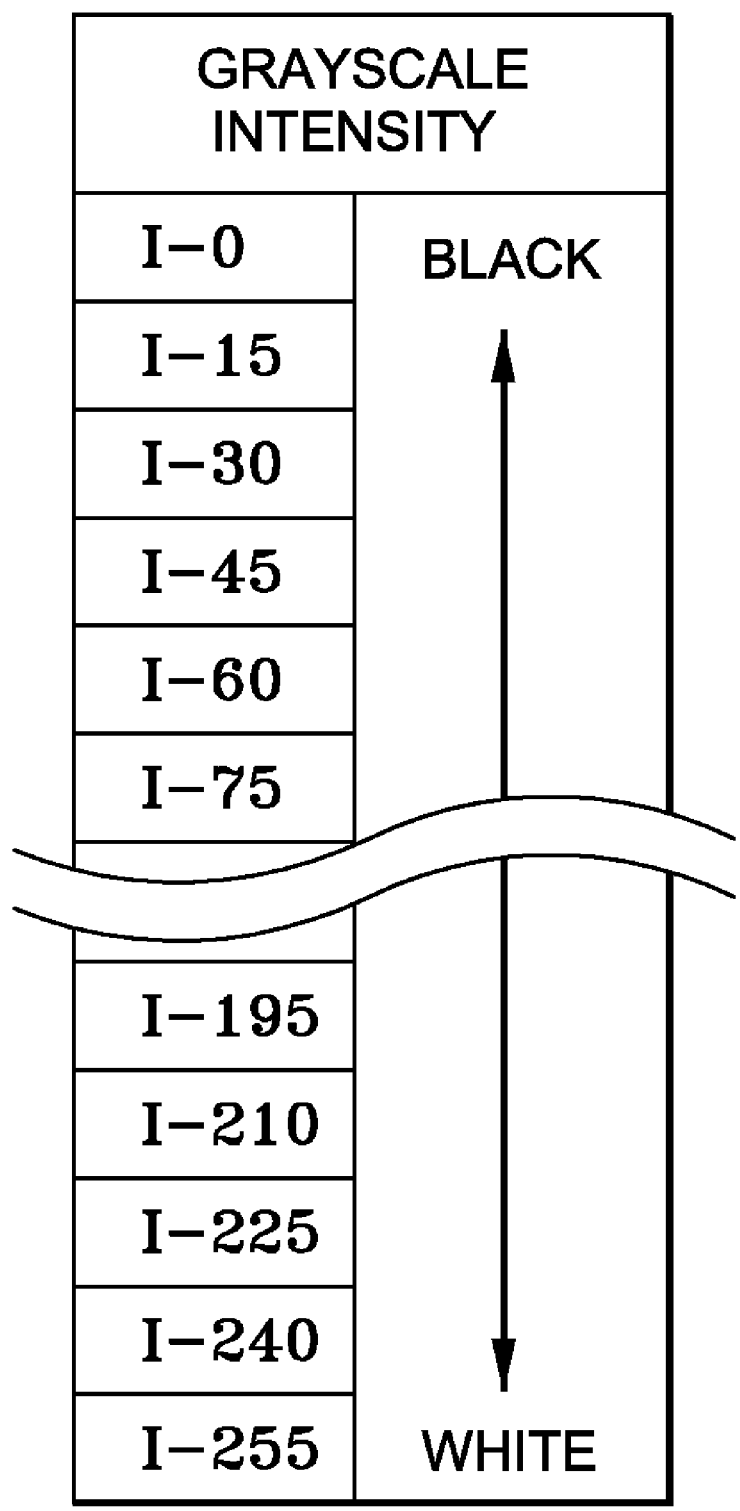
FIG. 10 is a chart illustrating a range of grayscale intensities for an 8-bit system providing 256 intensity levels.

As shown in FIG. 8, the digital image 150 may be comprised of a plurality of image pixels 152 which may be in RGB (i.e., primary color) format. However, the digital image 150 may be converted into grayscale format in step 304 of FIG. 27A. In an embodiment of the defect detection methodology, the color digital image 150 may be converted to grayscale format using any suitable software package. The digital image 150 file may be stored with 8-bits per sampled pixel to provide 256 grayscale intensities (i.e., shades of gray) of the image pixels 152 as determined in step 306 of FIG. 27A. FIG. 10 illustrates a chart of the relative grayscale intensities of the image pixels 152 including an intensity level of I-0 for black up to a maximum grayscale intensity of I-255 for white in an 8-bit system. However, other file formats including, but not limited to, 16-bit format may be implemented with the defect detection methodology disclosed herein.

As can be seen in FIG. 8, the image recording device 22 captures a digital image 150 of the transparency 104 as may be mounted within the transparency frame 116 and bounded at a lower edge 126 by the arch member 120 and having opposing lateral edges 128 extending upwardly toward the nose 130 of the transparency 104. The frame may define a perimeter 136 of the viewing portion 122 of the transparency 104. Also illustrated in FIG. 8 are several candidate defects 160 which may be included in the transparency 104 and which may be recorded during imaging of the transparency 104. Such candidate defects 160 may be identified as optical defects 162. As was earlier indicated, such optical defects 162 may comprise any number of a variety of different types of defects including, but not limited to, particulate matter embedded within the transparency 104 such as carbon particulates. However, any number of different types of defects may occur within the transparency 104 and may be detectable by the methodology.

The present disclosure may additionally facilitate detection of non-particulate defects in the transparency 104. For example, the disclosed methodology may be adapted for determining the haze and/or luminous transmittance of the transparency 104. As is known in the art, haze generally comprises scattering of light through the transparency 104 which may reduce contrast of objects that may be viewed through the transparency 104. Luminous transmittance may be defined as a measure of the amount of light that may pass through the transparency 104 relative to the amount of light that is incident upon the transparency 104.

The apparatus and methodology embodiments disclosed herein may facilitate the measurement of haze, luminous transmittance and various other optical factors of the transparency 104 based upon a pixel-by-pixel analysis of the digital image 150. In this regard, the image file may be analyzed in color format (i.e., RGB format) to facilitate the measurement of such optical parameters. For detecting defects such as carbon particulates which are generally black in color, the digital image 150 may be converted from color format to grayscale format as mentioned above in order to reduce computational intensity.

Figure 9:
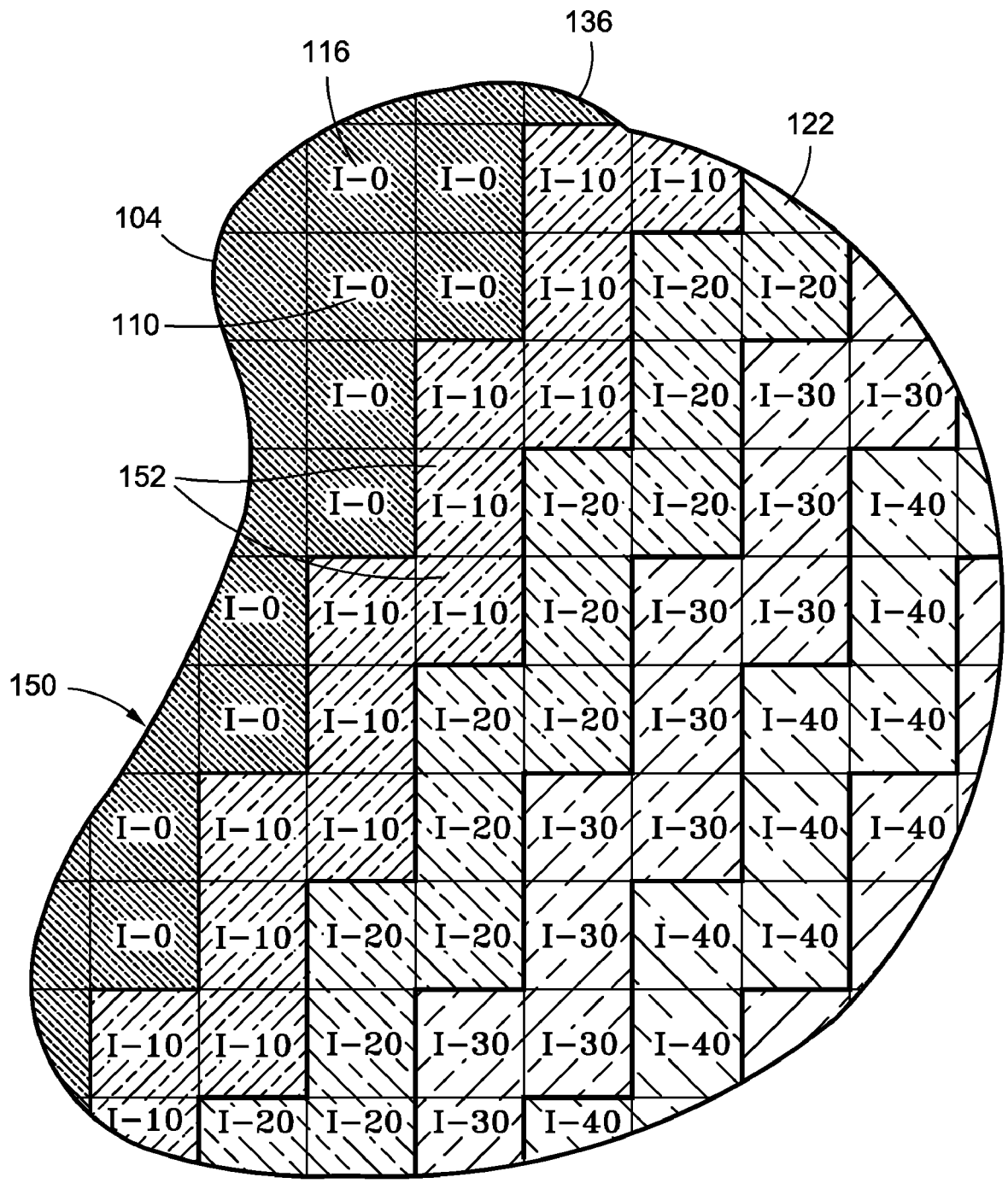
FIG. 9 is an enlarged illustration of a portion of the digital image taken along section 9 of FIG. 8 in an area adjacent to a perimeter of a viewing portion of the transparency and illustrating a plurality of image pixels each having a relative grayscale intensity.

Referring to FIGS. 8-10, step 308 of the methodology disclosed in FIGS. 27A-27B may include detecting the perimeter 136 of the transparency 104. The detection of the perimeter 136 may be performed by selecting a predefined perimeter 138 of the viewing portion 122 and/or by analyzing the image pixels 152 on a pixel-by-pixel basis. However, the detection of the perimeter 136 may be performed by using any suitable edge-detection technique. In regard to detecting the perimeter 136 by selecting a predefined perimeter 138, the methodology may comprise the use of previously defined positional coordinates of the perimeter 136 of the viewing portion 122.

Referring to the digital image 150 of FIG. 8, the perimeter 136 of the viewing portion 122 may be defined as the portion of the transparency 104 which transitions from the transparency frame 116 to the generally transparent viewing portion 122 of the transparency 104. In this regard, the predefined perimeter 138 may be determined by transforming a three-dimensional file of the transparency 104 into a two-dimensional projection which may be correlated to the panoramic digital image 150 recorded by the image recording device 22. For relatively simple geometries such as a right circular cone of the aircraft 100 windshield 110 illustrated in FIGS. 1-5, the perimeter 136 of the viewing portion 122 of the transparency 104 may be determined by projection of geometry from three dimensional to two-dimensional projection with relatively close matching with the digital image 150.

Alternatively, detection of the perimeter 136 of the viewing portion 122 of the transparency 104 in step 308 may comprise a pixel-by-pixel analysis of the image pixels 152 of the digital image 150 wherein a relatively uniform transition of the grayscale intensity may correspond to the detection of the perimeter 136. For example, and referring to FIG. 9, shown is a portion of the digital image 150 comprising the plurality of image pixels 152 wherein each one of the image pixels 152 has a grayscale intensity. A relatively uniform change in grayscale intensity between adjacent pixels (i.e., intensity gradient) across a predetermined series (i.e., quantity) of pixels may correspond to the perimeter 136 of the viewing portion 122 of the transparency 104. In a non-limiting example shown in FIG. 9, the left hand side of the portion of the digital image 150 includes pixels having a grayscale intensity of I-0 and which increase in a relatively uniform manner by gradient values of I-10 along a direction from the left-hand side of the portion of the digital image 150 in FIG. 9 toward the right-hand side of the portion of the digital image 150 in FIG. 9.

In contrast, a non-uniform or abrupt change in the grayscale intensity of adjacent image pixels 152 may be indicative of a defect such as a carbon particulate rather than an indication of the perimeter 136 of the viewing portion 122. In a further non-limiting example, a change in grayscale intensity along a series of pixels wherein grayscale intensities in the I-200's make an abrupt change to single digit (i.e., I-0) grayscale intensities may be representative of a defect and may not necessarily be representative of a perimeter 136 of the transparency 104. In this regard, the methodology contemplates adjustment or selection of the parameters for detecting the perimeter 136 such as adjusting or selecting the quantity of series of image pixels 152 to be considered during perimeter 136 detection.

Referring to FIGS. 11-16, step 310 of the methodology of FIGS. 27A-27B comprises detecting candidate defects 160 in the viewing portion 122 in order to determine whether such candidate defects 160 qualify as optical defects 162 or whether the candidate defects 160 comprise image defects 158. Such image defects 158 may comprise a relatively small number of image pixels 152 (e.g., less than three image pixels) in a localized area of the transparency 104 having a relatively low grayscale intensity (e.g., I-0). Such image pixels 152 may be surrounded by image pixels 152 that have a relatively high grayscale intensity (e.g., in the 200's).

Figure 11:
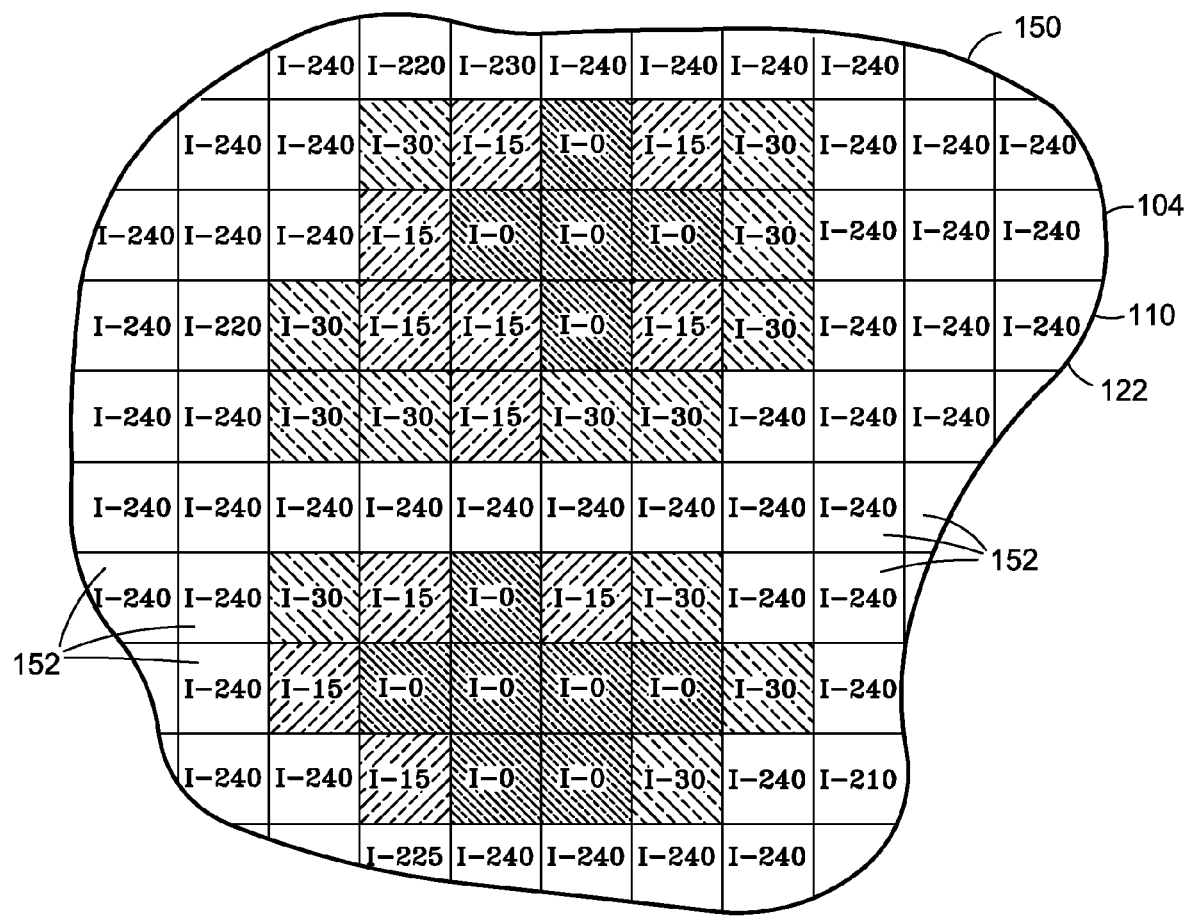
FIG. 11 is an illustration of a portion of the digital image taken along section 11 of FIG. 8 and illustrating each one of the image pixels being assigned a grayscale intensity and further illustrating a pair of candidate defects comprised of image pixels having a grayscale intensity value of 0.
Figure 12:
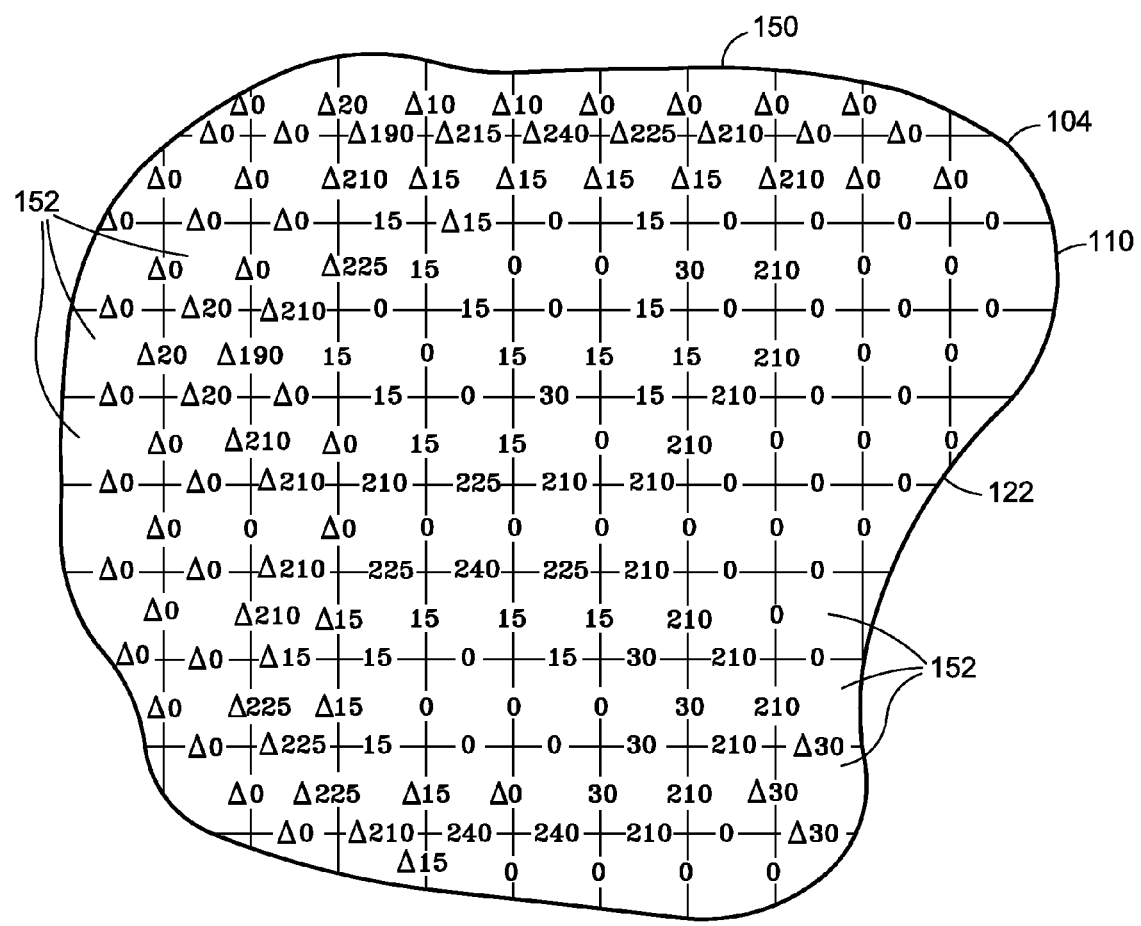
FIG. 12 is a representation of the image pixels illustrated in FIG. 11 and wherein an intensity gradient is calculated across each one of adjacent pairs of the image pixels.

In analyzing the candidate defects 160, the methodology may include step 312 (FIG. 27A) of calculating an intensity gradient (i.e., Δ210) across each one of the adjacent pairs of image pixels 152 in the digital image 150. For example, for the portions of the digital image 150 illustrated in FIG. 11, each one of the image pixels 152 has a grayscale intensity associated therewith. As can be seen in FIG. 11, several of the image pixels 152 may have a relatively low grayscale intensity and may be clustered together in one or more sets. Similar sets of image pixels 152 may be dispersed throughout the transparency 104. The intensity gradient may be calculated across each one of the adjacent pairs of the image pixels 152 in the horizontal (e.g., x) and vertical (e.g., y) directions as illustrated in FIG. 12 or in other direction depending upon the arrangement of pixels relative to one another in the digital image 150. For example, for one of the image pixels 152 in FIG. 12 having a grayscale intensity of I-0, the four image pixels 152 adjacent thereto may have grayscale intensities of I-0, I-15, I-240 and I-15.

Figure 13:
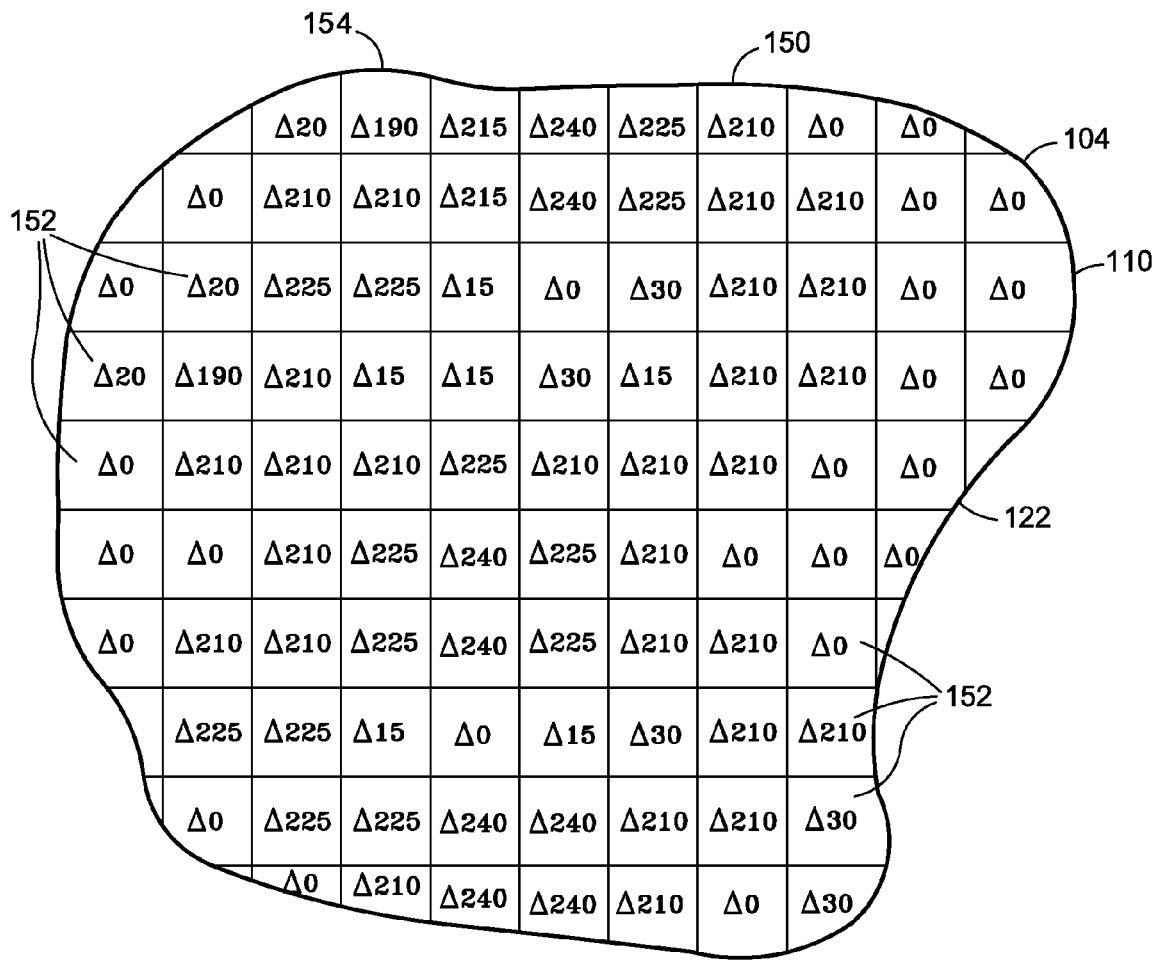
FIG. 13 is a gradient image of the image pixels illustrated in FIG. 11 wherein each image pixel of the gradient image includes a gradient value comprising a maximum of the absolute value of the intensity gradients associated with the image pixel.

Referring to FIG. 13, step 314 (FIG. 27A) of the methodology may include assigning to each one of the image pixels 152 a gradient value. The gradient value selected for each one of the image pixels 152 may comprise a maximum of the absolute value of the intensity gradients associated with each one of the image pixels 152. For the above-noted example, the image pixels 152 may be assigned the maximum gradient value (i.e., Δ240) of the grayscale intensities (I-0, I-15, I-240, I-15) of the four adjacent image pixels 152. An alternative approach to assigning a gradient value to a pixel may be to record the associated gradient intensity in an x-direction, record the gradient intensity in the y-direction, and then assign the larger of the x-direction gradient value and the y-direction gradient value as the value assigned to the image pixel 152. Upon selecting a gradient value for each one of the image pixels 152, step 316 of FIG. 27A may comprise constructing a gradient image 154 comprised of the gradient values that are assigned to each one of the image pixels 152 as is illustrated in FIG. 13.

Step 318 of FIG. 27A comprises identifying the image pixels 152 that have a gradient value that exceeds a predetermined gradient threshold. For example, each image pixel 152 having a gradient value of at least 4100 may be identified and the location thereof may be flagged or noted. In this manner, the gradient threshold provides a means for identifying relatively abrupt changes in grayscale intensity which may correspond to the location of an optical defect 162 as opposed to the perimeter 136 of the viewing portion 122. As may be appreciated, the gradient threshold may be set to any desirable value suitable for the transparency 104 that is under examination. Upon identifying the image pixels 152 having the gradient value that exceeds the gradient threshold, such image pixels 152 may be designated as candidate pixels 156. The candidate pixels 156 may comprise one or more candidate defects 160 in the transparency 104.

Figure 14:
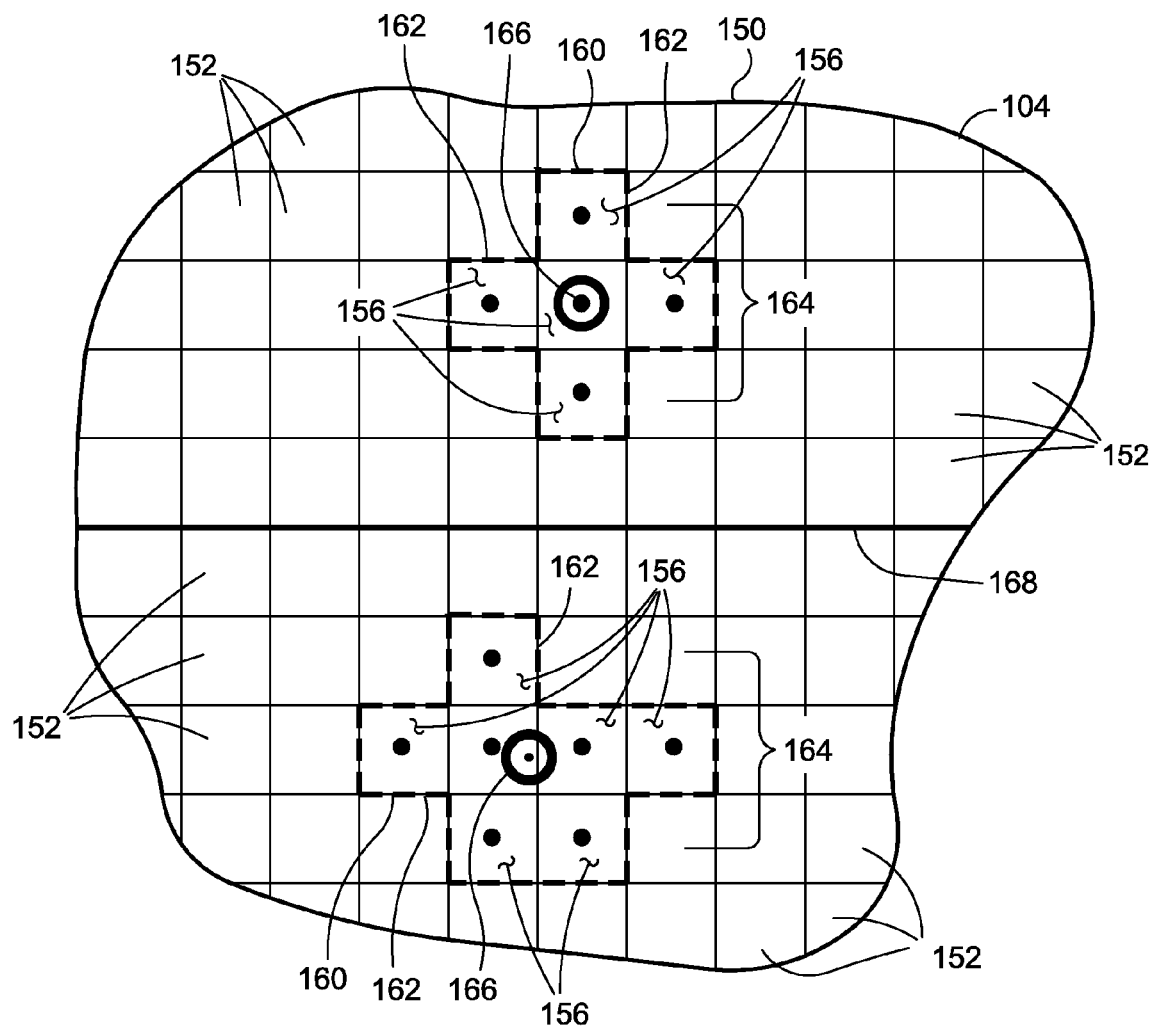
FIG. 14 is a representation of the image pixels illustrated in FIG. 11 wherein image pixels having a gradient value exceeding a gradient threshold are clustered into pixel clusters comprised of candidate pixels.

Referring to FIG. 14, step 320 (FIG. 27B) of the methodology may comprise classifying the candidate defects 160 which may include identifying the location of each one of the candidate pixels 156 designated in step 318. As part of classifying the candidate defects 160, the location of each one of the candidate pixels 156 may be identified in step 322 (FIG. 27B). The locations of the candidate pixels 156 may be identified in terms of the origin and coordinate system of the digital image 150 as illustrated in FIG. 8. Referring still to FIG. 14, step 324 (FIG. 27B) of the classifying operation may comprise clustering or partitioning the candidate pixels 156 into one or more pixel clusters 164 based upon the relative locations of the candidate pixels 156. For example, FIG. 14 illustrates two sets of pixels that were flagged or identified in step 318 as areas of relatively high gradient values.

Once identified, the candidate pixels 156 may be clustered in step 324 by a suitable clustering technique. In addition, a centroid 166 may be defined for each one of the pixel clusters 164 of candidate pixels 156. In this manner, the locations of the candidate pixels 156 may be grouped with other candidate pixels 156 which are relatively close in proximity. The grouping or clustering of the candidate pixels 156 may include partitioning of the digital image 150 into a plurality of pixel clusters 164. FIG. 14 illustrates a partition 168 separating the two pixel clusters 164. However, throughout the entire digital image 150 of the transparency 104, the image pixels 152 may include candidate pixels 156 that may be clustered into a plurality of pixel clusters 164 which may be separated by partitions 168.

In an embodiment, the step of clustering the candidate pixels 156 may be performed using k-means clustering or by using any other suitable clustering technique. In k-means clustering, k comprises an integer corresponding to a k quantity of clusters. The value of k may be preselected prior to initiating the clustering process or the value of k may be designated as being at least equivalent to the total quantity of image pixels 152 in the digital image 150 or to any other suitable value. As illustrated in FIG. 14, each one of the pixel clusters 164 may include a centroid 166 associated therewith. The centroid 166 may represent a natural center of the candidate pixels 156 included within the pixel cluster 164.

Step 326 (FIG. 27B) of the methodology may further comprise comparing the quantity of the candidate pixels 156 in each one of the pixel clusters 164 to a pixel quantity threshold in order to determine whether the candidate defect 160 comprises an optical defect 162 or an image defect 158. In an embodiment, the pixel quantity threshold may be selected as a relatively small number of image pixels 152 (e.g., more than three image pixels 152 qualify as an optical defect 162). For example, in FIG. 14, the lowermost one of the pixel clusters 164 includes seven of the candidate pixels 156. Likewise, the upper one of the pixel clusters 164 includes five of the candidate pixels 156 such that each of the pixel clusters 164 illustrated in FIG. 14 qualifies as an optical defect 162 using the example pixel quantity threshold.

Figure 16:
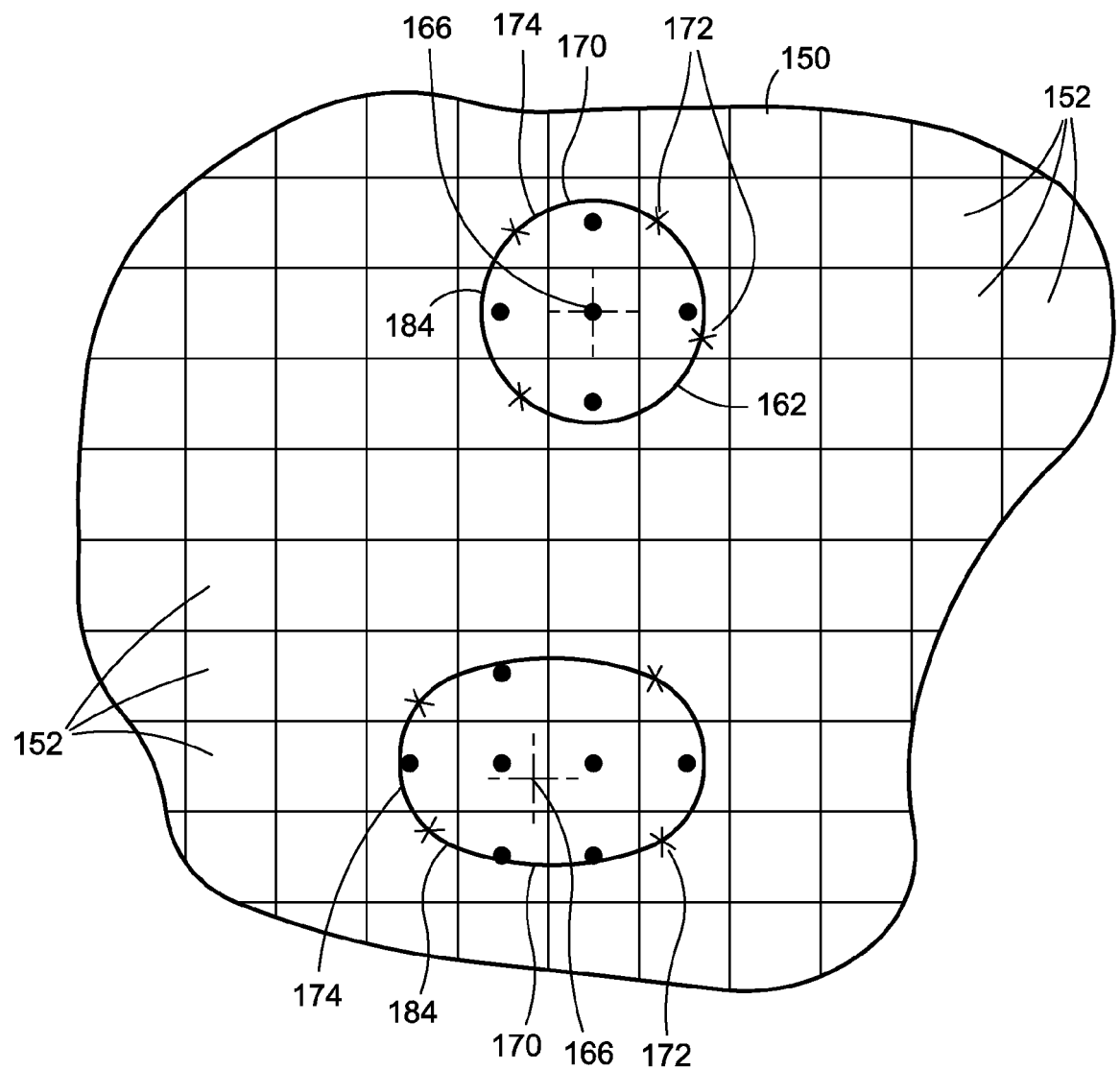
FIG. 16 is a representation of the image pixels illustrated in FIG. 11 and further illustrating the computer generated curves converging on respective boundaries of the optical defects defined by the candidate pixels.
Figure 17:
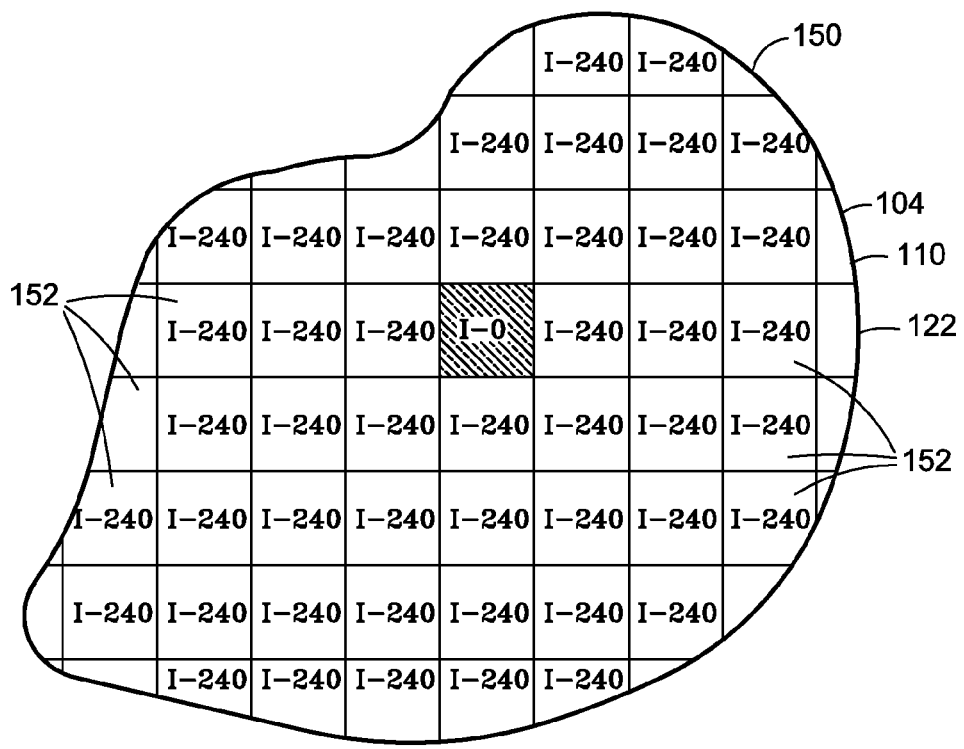
FIG. 17 is an illustration of a portion of the digital image taken along section 17 of FIG. 8 and illustrating a single one of the image pixels having a grayscale intensity of 0 and being surrounded by image pixels having a grayscale intensity of greater magnitude.
Figure 18:
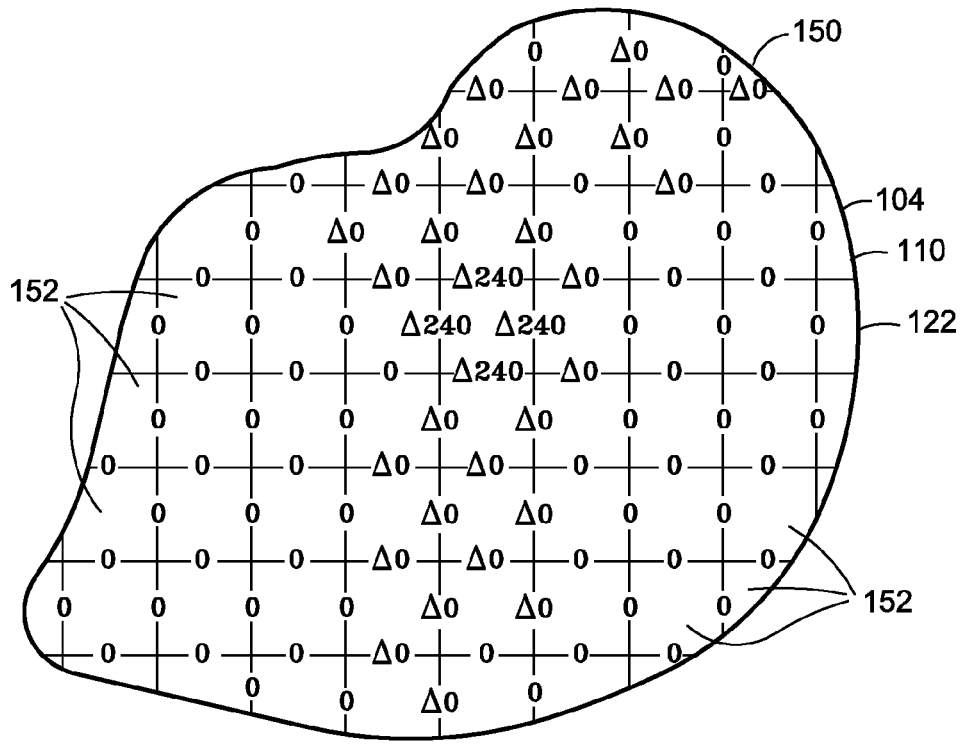
FIG. 18 is a representation of the image pixels illustrated in FIG. 17 and further illustrating a plurality of intensity gradients calculated across each one of adjacent pairs of the image pixels.

In contrast and referring to FIG. 17-20, the portion of the digital image 150 illustrated in FIG. 17 includes a single one of the image pixels 152 having a relatively low grayscale intensity value (i.e., I-0) and which is surrounded by image pixels 152 having a relatively high grayscale intensity value (i.e., I-240). The process of analyzing the portion of the digital image 150 illustrated in FIGS. 17-20 is similar to that which is described above with regard to the digital image 150 portions illustrated in FIGS. 8-16. In this regard, the process includes step 310 of detecting the candidate defects 160 is performed on the portion of the digital image 150 illustrated in FIG. 17 and which results in calculation of the intensity gradients in step 312 as illustrated in FIG. 18.

Figure 19:
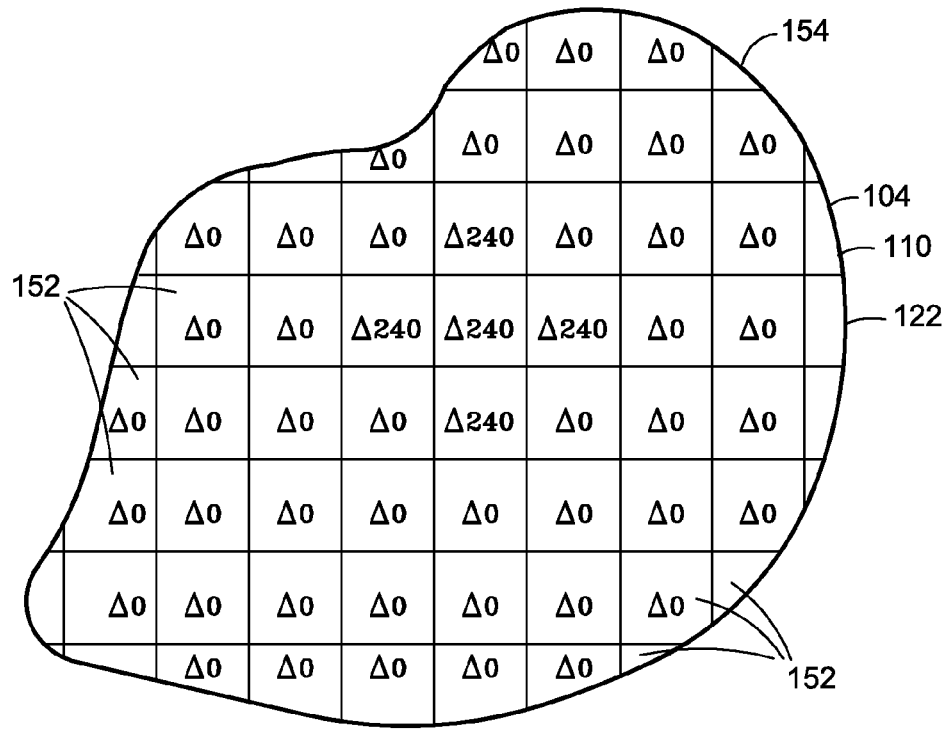
FIG. 19 is a representation of the image pixels illustrated in FIG. 17 and illustrating a gradient image comprising gradient values corresponding to a maximum of the absolute value of the intensity gradients associated with each one of the pixels.
Figure 20:
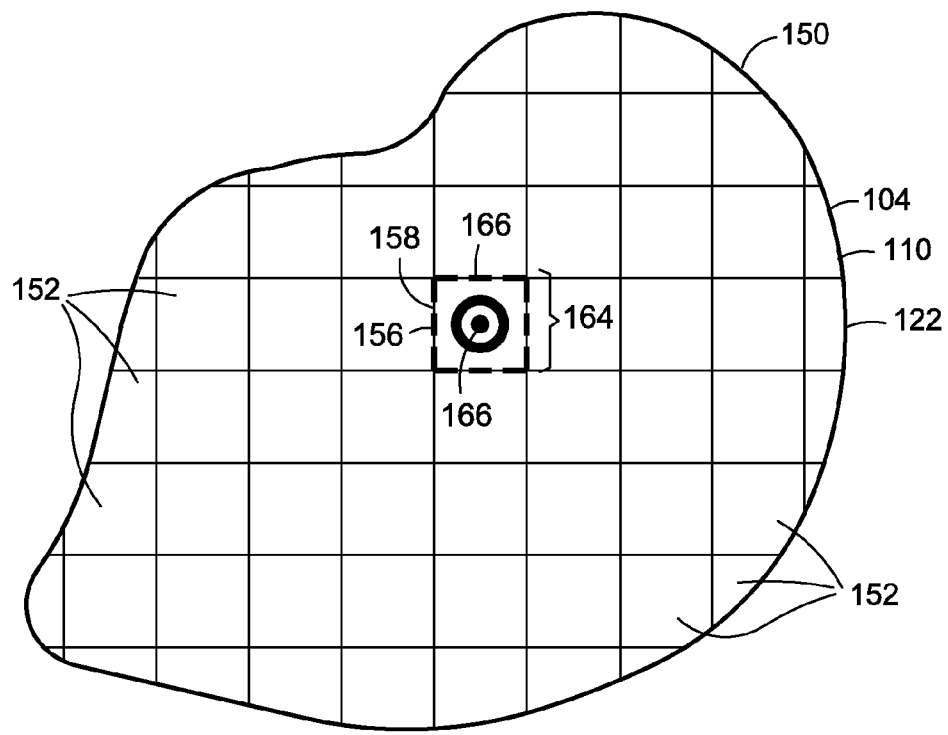
FIG. 20 is a representation of the image pixels illustrated in FIG. 17 and illustrating a pixel cluster comprised of a single one of the image pixels having a grayscale intensity of 0.

The process further includes assigning the gradient value to each one of the image pixels 152 in step 314 as illustrated in FIG. 19, and identifying the candidate pixels 156 having a gradient value exceeding the gradient threshold of step 318 in order to flag the image pixels 152 illustrated in FIG. 20 as an area of high gradient and indicative of a potential optical defect 162. Under the pixel quantity threshold criterion (i.e., more than three image pixels 152 qualifies as an optical defect 126) as indicated in the example above, the step of comparing the quantity of the candidate pixels 156 illustrated in FIG. 20 results in classifying the single image pixel 152 as an image defect 158 instead of an optical defect 162. The single candidate pixel 156 illustrated in FIG. 20 may result from a bad pixel due to an anomaly during the process of imaging the transparency 104.

Figure 15:
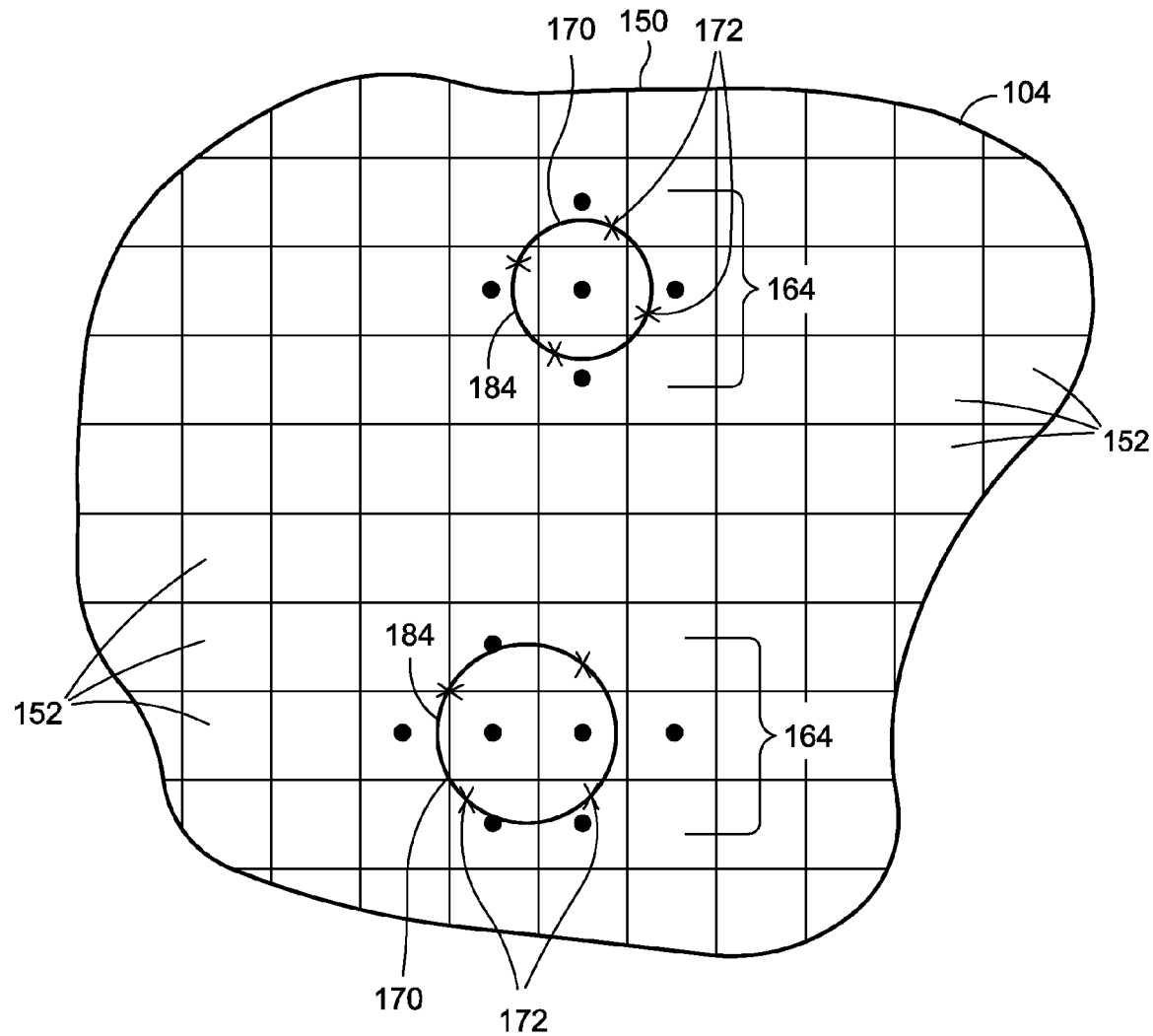
FIG. 15 is a representation of the image pixels illustrated in FIG. 11 and further illustrating a computer generated curve superimposed on each one of the pixel clusters.

Referring to FIG. 15, step 328 (FIG. 27B) of the methodology may comprise determining the boundary 174 (FIG. 16) of the optical defects 162. In this regard, the boundary 174 may be determined by using an energy function having an active contour 184 (FIG. 15) associated therewith. The energy function may comprise an internal energy and external energy. The active contour 184 may converge on the boundary 174 in an iterative manner until the energy of the internal and external energy functions is minimized. In an embodiment, the energy function may facilitate a determination of the boundary 174 by superimposing a curve such as a computer generated curve 170 (i.e., circle, ellipse, etc.) onto the cluster of candidate pixels 156 representing the optical defects 162. The computer generated curve 170 may include control points 172 and may generally represent a closed contour that may be converged onto the boundary 174 of the optical defects 162 by manipulating the control points 172.

For example, FIG. 15 illustrates a generally circular-shaped active contour 184 superimposed over each one of the pixel clusters 164. In each pixel cluster 164, the active contour 184 (i.e., circle) may be sized to fit within the outer limits of the candidate pixels 156 which comprise the pixel cluster 164. The active contour 184 may then be expanded in a predetermined manner. For example, the control points 172 of the active contour 184 of the upper pixel cluster 164 in FIG. 15 may be manipulated in order to maintain a predetermined curvature of the active contour 184. Alternatively, the active contour 184 may be selected to circumscribe the outer limits of the candidate pixels 156 which comprise the pixel cluster 164. The active contour 184 may then be reduced in size or shrunk in a predetermined manner onto the boundary 174 of the pixel cluster 164.

As indicated above, the active contour 184 is associated with an energy function comprising internal energy and external energy. The internal energy may be tailored for a specific application and may include a relatively low degree of curvature capability in the active contour 184 such that the contour resists bending. Alternatively, the internal energy may be relatively high for the active contour 184 resulting from a low stiffness of the active contour 184. In addition, the internal energy of the active contour 184 may include a propensity for the active contour 184 to expand or shrink in size. For example, in the active contours 184 illustrated in FIG. 15, the internal energy for each one of the active contours 184 may have a propensity to grow in size until the active contour 184 approaches the boundary 174 of the pixel cluster 164. Likewise, the active contour 184 includes an external energy function corresponding to the optical defects 162 represented by the candidate pixels 156 in FIG. 15.

In the example of FIG. 15, as the active contours 184 expand towards the boundary 174 of the optical defects 162, the shape of the active boundary 174 may be affected depending upon the intensity gradients of the image pixels 152 adjacent to the optical defects 162. For example, areas of low energy may be defined by relatively low intensity gradients of image pixels 152 located on an exterior of the boundary 174 of the optical defects 162. Alternatively, areas of high energy may be associated with image pixels 152 located adjacent to the boundary 174 and therefore may have relatively high intensity gradients. The active contour 184 may converge on the boundary 174 in an iterative manner until the energy of the internal and external energy functions is minimized as indicated above. FIG. 16 illustrates the active contours 184 converged upon the boundary 174 of respective ones of the optical defects 162.

Figure 21:
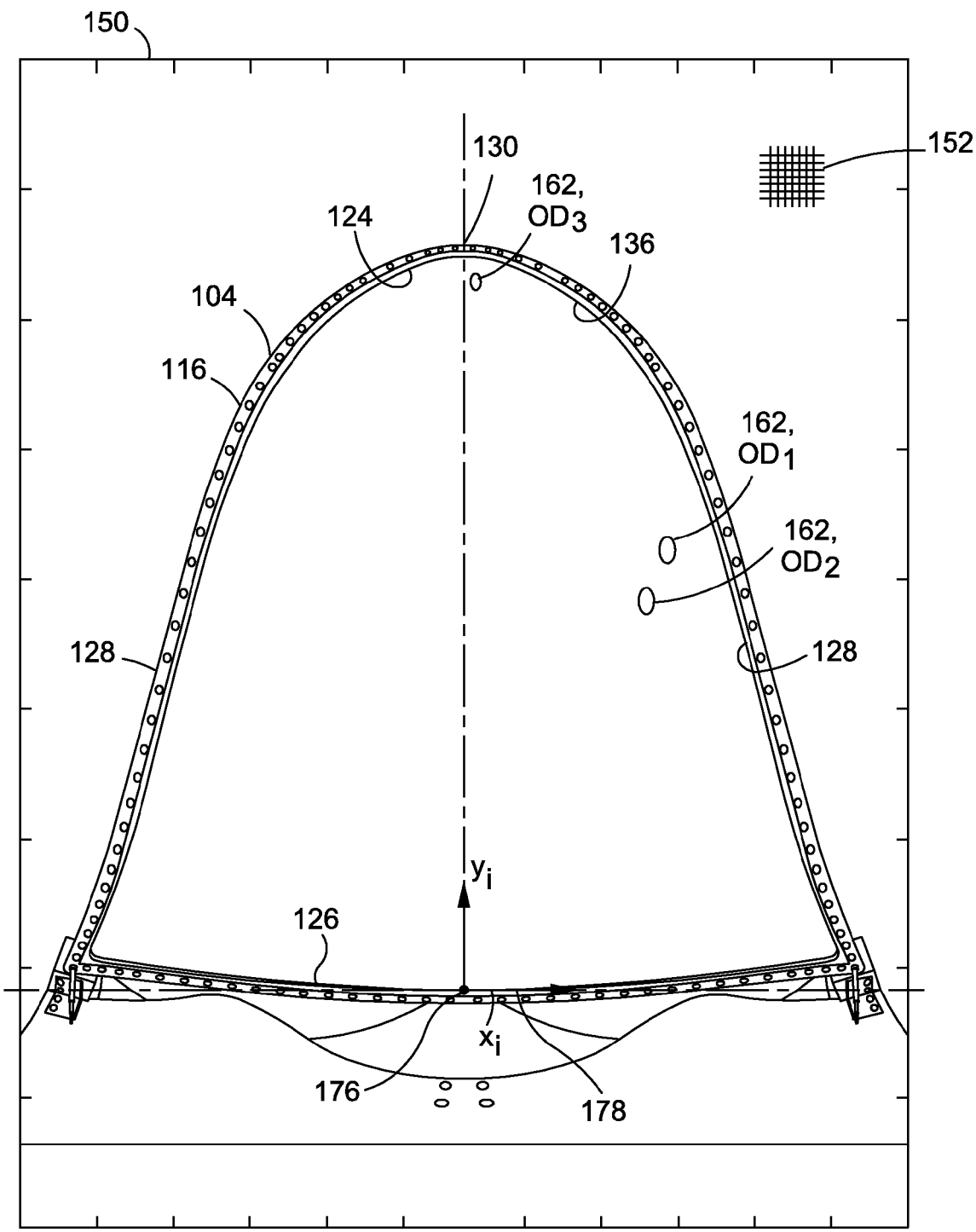
FIG. 21 is an illustration of the digital image of the transparency and illustrating the relative locations of a plurality of optical defects in the digital image.

Referring to FIGS. 21-23, upon determining the boundary 174 of the optical defects 162 in the digital image 150, step 330 (FIG. 27B) may comprise characterizing the location of the optical defects 162 relative to the transparency 104 itself. More particularly, the two-dimensional location of the optical defects 162 in the digital image 150 may be transformed using a first fixed coordinate transformation in order to characterize and locate the optical defects 162 on the three-dimensional transparency 104. In this manner, the location of the optical defects 162 may be identified with respect to a known or pre-selected reference point on the transparency 104, vehicle, structure or other reference point. For example, the optical defects 162 may be located with respect to a design eye 140 of an aircraft 100. The design eye 140 may comprise an approximate location of the eye of a crew member (e.g., pilot) from which the optical defects 162 may be viewed or perceived as illustrated in FIG. 22.

In this regard, FIG. 21 illustrates first, second and third optical defects 162, $OD_1$, $OD_2$, $OD_3$ which are located on the digital image 150 of the transparency 104 with respect to the digital image origin 176 and digital image coordinate system 178 shown in FIG. 21. A first fixed coordinate transformation may be employed to transform the locations of each one of the first, second and third optical defects 162, $OD_1$, $OD_2$, $OD_3$ from their respective locations on the digital image 150 in FIG. 21 to the corresponding locations on the physical three-dimensional transparency 104 as illustrated in FIG. 22. The location of the optical defects 162 in FIG. 22 may be defined in terms of a transparency origin 180 and a transparency coordinate system 182 as illustrated in FIG. 22. However, any suitable reference position or origin may be employed for characterizing the locations of the optical defects 162. FIG. 23 illustrates the locations of the first, second and third optical defects 162, $OD_1$, $OD_2$, $OD_3$ identified in the digital image 150 of FIG. 21 and transformed to the transparency 104.

Figure 24:
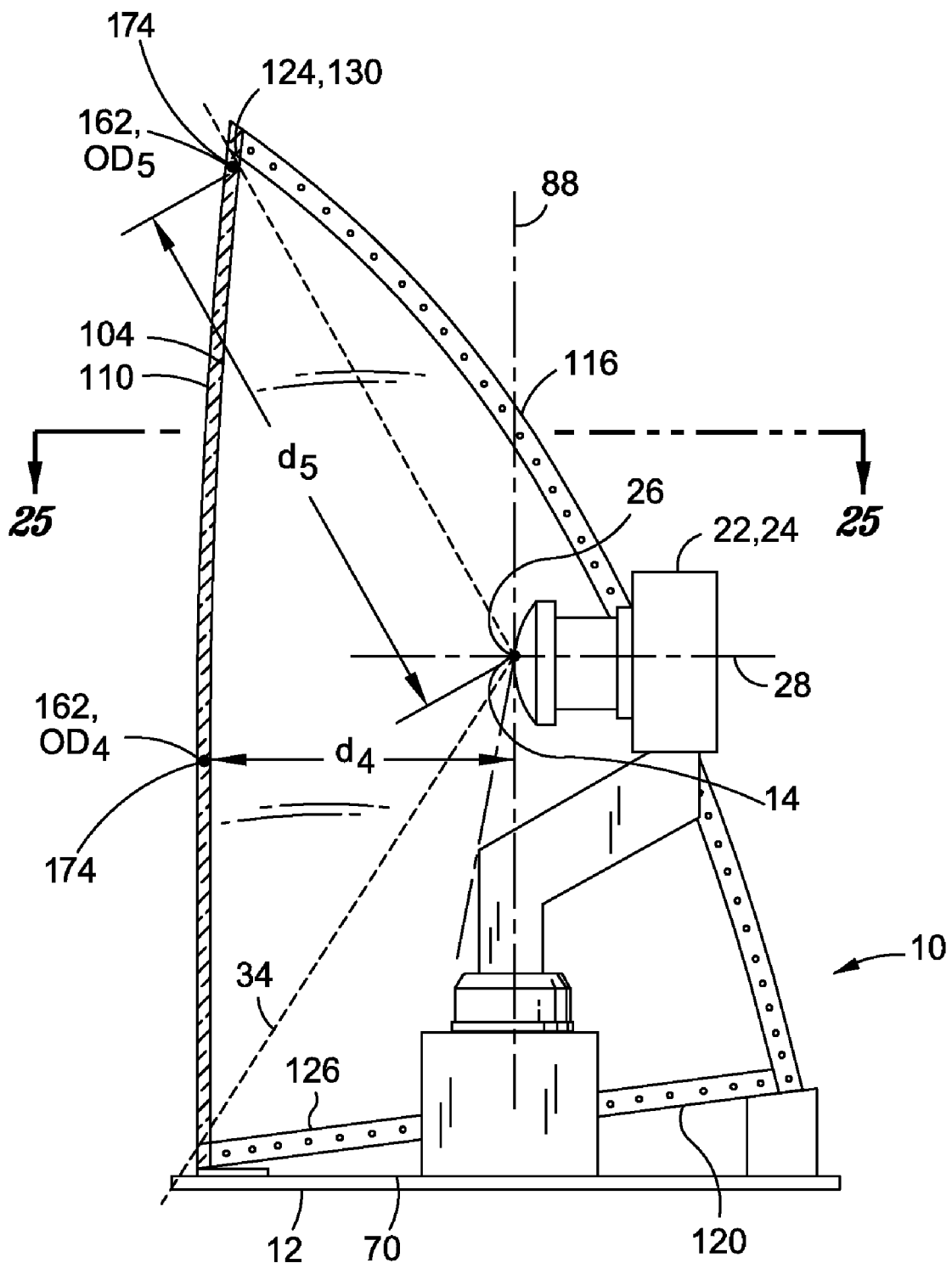
FIG. 24 is a side sectional illustration of the defect detection system illustrating the difference in distance from an optical center of the image recording device and the locations of optical defects in the transparency as for characterizing the sizes of the optical defect in the transparency by transformation using a second fixed coordinate transformation.
Figure 25:
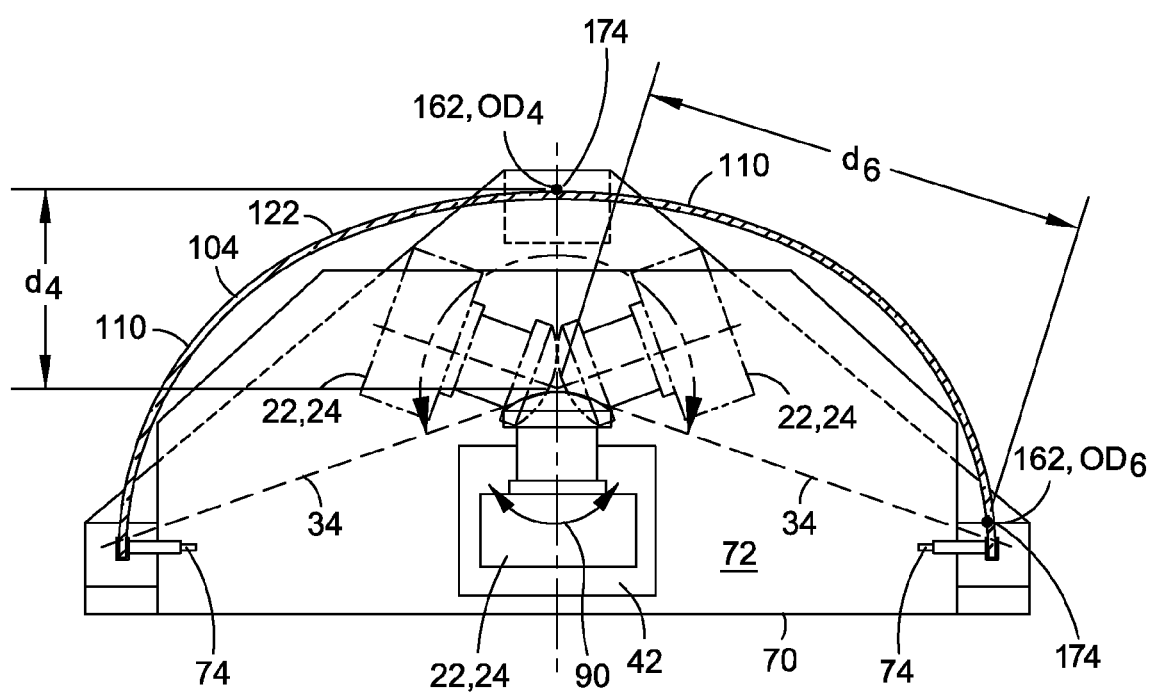
FIG. 25 is a sectional illustration of the defect detection system taken along line 25 of FIG. 24 and further illustrating differences in distance between the optical center of the image recording device and the optical defects.

Referring to FIGS. 24-25, step 332 (FIG. 27B) of the methodology may comprise characterizing the size of the optical defects 162 relative to the transparency 104. More specifically, step 332 may comprise scaling the optical defects 162 identified in the digital image 150 of the transparency 104 in FIG. 21 in proportion to the distance from the optical defects 162 to the optical center 142 of the image recording system used for imaging the transparency 104. For example, FIG. 24 illustrates a side view of the image recording device 22 mounted on the transparency fixture 70 and illustrating distances $d_4$, $d_5$ from the optical center 142 of the image recording device 22 to a fourth optical defect 162, $OD_4$ and a fifth optical defect 162, $OD_5$, respectively. FIG. 25 likewise illustrates the lateral distances $d_4$, $d_6$ from the optical center 142 of the image recording device 22 to fourth and sixth optical defects 162, $OD_4$, $OD_6$.

In this regard, step 332 may characterize the size of the optical defects 162 in terms of physical size and in proportion to the distance of the optical defects 162 from a location on the image recording device 22 (e.g., the optical center 142) by using a second fixed coordinate transformation and/or a scaling transformation. In this manner, the size of the optical defects 162 in the digital image 150 may be scaled up or down in proportion to the relative distance between the image recording device 22 and the transparency 104. In addition, the transformation may compensate for the angle at which the optical defects 162 is imaged by the image recording device 22 relative to the angle at which the optical defects 162 may be viewed in the three-dimensional transparency 104 such as from the design eye 140 position of the pilot illustrated in FIG. 22. In this manner, step 332 provides a means for mapping the optical defects 162 identified in the digital image 150 from a quantity of pixels to measurement units such as length units (i.e., inches, millimeters) or area units (i.e., square inches, square millimeters) from a given reference point.

In step 334 (FIG. 27B), the methodology may comprise characterizing the shape of the optical defects 162. More specifically, optical defects 162 detected and characterized with regard to location and size in steps 330 and 332, respectively, may optionally be characterized with regard to shape. Shape characterization may facilitate the comparison of the shapes of the optical defects 162 and other relevant parameters thereof as a means for tracking the occurrence of the optical defects 162 in subsequently analyzed transparencies 104.

In an embodiment, the step 334 of characterizing the shape of the optical defects 162 may employ two-dimensional convolution integration as illustrated in FIGS. 26A-26C wherein a modeling function may be convolved into an equivalent function which may represent an active segment such as the viewing portion of the digital image 150 of the transparency 104. The output resulting from the convolution may facilitate the prediction of the types of optical defects 162 in a transparency 104 under inspection based upon the shape characteristics of optical defects 162 in other transparencies 104 of similar or identical configuration.

In this regard, the step of characterizing the shape of optical defects 162 may facilitate the identification of the type of particulate matter detected in the above-described method based upon a predetermined classification of certain types of defects (e.g., carbon particulates) being associated with a certain shape or class of shapes (e.g., a circular shape, an oval shape, etc.) as certain types of particulates may be associated with certain shapes. For example, a database containing a listing of particulate types and their associated shapes may be recorded on an ongoing basis during the inspection of a series of transparencies of a given configuration such as a given ply layup of a transparency. For example, as indicated above, an aircraft 100 windshield 110 (FIG. 24) may be comprised of multiple plies of acrylic, polyurethane, polycarbonate with one or more of the plies including certain types of particulate matter such as polycarbonate particulates in the polycarbonate layer. By continuously updating the database with the characterized shapes of the optical defects and the type or class of particulate matter associated therewith as each transparency 104 is inspected, the ability to detect optical defects 162 in additional transparencies 104 may be improved. In addition, the characterization of optical defects may also provide an indication as to the source of such defects or the manner in which such optical defects 162 occur in a given transparency 104 configuration.

Referring to FIGS. 26A-26C, the method of classifying the shape of an optical defect 162 may include the use of a two-dimensional convolution wherein the modeling function f(x,y) (FIG. 26A) may represent a predefined defect shape such as a circular shape. However, the modeling function f(x,y) may represent any one of a variety of different predefined defect shapes and is not limited to a circular shape. For example, the modeling function f(x,y) may represent an oval shape which may be further defined in terms of an aspect ratio of the oval shape. The equivalent function g(x,y) (FIG. 26B) may be defined as a portion of an active segment of the digital image 150 such as the viewing portion 122 of the digital image 150 described above and illustrated in FIG. 8. However, the equivalent function g(x,y) may be defined as an entire portion of a segment of a digital image 150 and is not limited to a specific portion of the digital image 150.

In a non-limiting example of the computation of a two-dimensional convolution for characterizing the shape of an optical defect 162 and referring to FIGS. 26A-26C, shown are two input matrices representing a modeling function f(x,y) and an equivalent function g(x,y), respectively. The modeling function f(x,y) matrix illustrated in FIG. 26A may represent a circular shaped optical defect 162 similar to that which is illustrated as the upper one of the optical defects 162 illustrated in FIG. 16. The values in the matrix f(x,y) may correspond to the normalized grayscale intensities of image pixels 152 of the transparency 104 similar to that which is illustrated in FIG. 11. The function g(x,y) may represent a portion of the digital image 150 of the transparency 104 of FIG. 8 and may comprise a matrix including values corresponding to normalized grayscale intensities of the image pixels 152 similar to that which is illustrated in FIG. 11.

As shown in FIGS. 26A-26C, the two-dimensional convolution may be defined as the convolution matrix f*g(x,y) of the f(x,y) and g(x,y) matrices. In a non-limiting example, the values of the convolution matrix f*g(x,y) may be determined by the equation f*g(x,y)={f(x−1,y−1)g(1,1)+f(x,y−1)g(2,1)+f(x+1,y−1)g(3,1)+f(x−1,y)g(1,2)+f(x,y)g(2,2)+f(x+1,y)g(3,2)+f(x−1,y+1)g(1,3)+f(x,y+1)g(2,3)+f(x+1,y+1)g(3,3)}/9, wherein x and y are matrix indices indicating the relative positions of the matrix values. In the above-noted example, the x and y matrix indices increase incrementally along a direction from left to right and from top to bottom, respectively, in each one of the matrices.

The output convolution matrix f*g(x,y) may be compared to the database of optical defects 162 to identify the shape and associated type or class of particulate matter in the transparency 104. In this manner, the shape characterization step may facilitate the prediction of the types of optical defects 162 occurring in other transparencies of similar or identical configuration. In FIG. 26C, the local maxima of (e.g., 5/9) of the output convolution matrix f*g(x,y) may correspond to a center of an optical defect 162. In this regard, the local maxima may be associated with a given shape of the optical defect 162 as represented by the modeling function f(x,y) matrix illustrated in FIG. 26A. As indicated above, the continuous updating of the database of optical defect 162 shapes as each transparency 104 is inspected may facilitate the detection of optical defects 162 and may provide an indication as to the source of such defects and/or the manner in which such optical defects 162 occur during manufacturing.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of detecting optical defects in a transparency, comprising the steps of:
providing a digital image of the transparency, the digital image including a plurality of image pixels each having a grayscale intensity;
detecting at least one candidate defect by performing the following:
determining a grayscale intensity of each one of the image pixels;
calculating an intensity gradient across adjacent pairs of the image pixels;
assigning to each image pixel a gradient value comprising a maximum of the absolute value of the intensity gradients associated with the image pixel;
constructing a gradient image comprising the gradient values assigned to corresponding ones of the image pixels; and
identifying as candidate pixels the image pixels having a gradient value exceeding a gradient threshold, the candidate pixels comprising the candidate defect;
identifying optical defects among the candidate defect by performing the following:
determining the location of each one of the candidate pixels;
clustering the candidate pixels into at least one pixel cluster based upon the relative locations of the candidate pixels; and
comparing the quantity of the candidate pixels in the pixel cluster to a pixel quantity threshold to identify the candidate defect as at least one of an optical defect and an image defect.

2. The method of claim 1 wherein the step of comparing the quantity of the candidate pixels in the pixel cluster to the pixel quantity threshold comprises:
identifying the candidate defect as an optical defect if the pixel cluster contains at least three of the image pixels; and
identifying the candidate defect as an image defect if the pixel cluster contains less than three of the image pixels.

3. The method of claim 1 wherein:
the step of clustering the candidate pixels is performed using k-means clustering.

4. The method of claim 3 further wherein:
k comprises an integer corresponding to at least the total quantity of image pixels in the digital image.

5. The method of claim 1 further comprising the step of:
determining a boundary of the optical defect by using an energy function.

6. The method of claim 5 wherein the energy function comprises an active contour, the step of determining the boundary of the optical defect comprising:
converging a computer generated curve onto the boundary; and
manipulating control points of the computer generated curve to converge the curve onto the boundary.

7. A method of characterizing optical defects in a transparency, comprising the steps of:
providing a digital image of the transparency, the digital image including a plurality of image pixels;
identifying candidate pixels among the image pixels, the candidate pixels comprising at least one candidate defect;
identifying the location of each one of the candidate pixels;
clustering the candidate pixels into at least one pixel cluster based upon the relative locations of the candidate pixels; and
comparing the quantity of the candidate pixels in the pixel cluster to a pixel quantity threshold to identify the candidate defect as at least one of an optical defect and an image defect.

8. The method of claim 7 wherein:
the step of clustering the candidate pixels is performed using k-means clustering.

9. The method of claim 7 further wherein:
k comprises an integer corresponding to at least the total quantity of image pixels in the digital image.

10. The method of claim 7 wherein the step of comparing the quantity of the candidate pixels in the pixel cluster to the pixel quantity threshold comprises:
identifying the candidate defect as an optical defect if the pixel cluster contains at least three of the image pixels; and
identifying the candidate defect as an image defect if the pixel cluster contains less than three of the image pixels.

11. The method of claim 7 further comprising the steps of detecting at least one candidate defect in the transparency by performing the following:
determining a grayscale intensity of each one of the image pixels;
calculating an intensity gradient across adjacent pairs of the image pixels;
assigning to each image pixel a gradient value comprising a maximum of the absolute value of the intensity gradients associated with the image pixel;
constructing a gradient image comprising the gradient values assigned to corresponding ones of the image pixels; and
identifying as candidate pixels the image pixels having a gradient value exceeding a gradient threshold, the candidate pixels comprising the candidate defect.

12. The method of claim 7 further comprising the step of:
determining a boundary of the optical defect by using an energy function.

13. The method of claim 12 wherein the energy function comprises an active contour, the step of determining the boundary of the optical defect comprising:
converging a computer generated curve onto the boundary; and
manipulating control points of the computer generated curve to converge the curve onto the boundary.

14. The method of claim 7 further comprising the step of characterizing the optical defects by at least one of location, size and shape by performing a corresponding one of the following steps:
  characterizing the location of the optical defect relative to transparency using a coordinate transformation;
  characterizing the size of the optical defect relative to the transparency using a scaling transformation; and
  characterizing a shape of the optical defect by convolution.

15. A method of detecting optical defects in a transparency having a viewing portion, the method comprising the steps of:
  providing a digital image of the transparency, the digital image including a plurality of image pixels each having a grayscale intensity;
  detecting a perimeter of the viewing portion by performing at least one of the following:
    selecting a predefined perimeter of the viewing portion;
    comparing the change in grayscale intensity across a series of the pixels to a threshold intensity change rate;
  detecting candidate defects in the viewing portion by performing the following:
    calculating an intensity gradient across each one of adjacent pairs of the image pixels, the intensity gradient representing the difference in the grayscale intensities of the adjacent pairs of the image pixels;
    assigning to each image pixel a gradient value comprising a maximum of the absolute value of the intensity gradients associated with the image pixel;
    constructing a gradient image comprising the gradient values assigned to corresponding ones of the image pixels;
  identifying as candidate pixels the image pixels having a gradient value exceeding a gradient threshold, the candidate pixels comprising the candidate defect;
  classifying the candidate defects by performing the following:
    identifying the location of each one of the candidate pixels;
    clustering the candidate pixels into at least one pixel cluster based upon the locations of the candidate pixel;
    comparing the quantity of the candidate pixels in the pixel cluster to a pixel quantity threshold to identify the candidate defect as at least one of an optical defect and an image defect;
    determining a boundary of the optical defect by using an energy function; and
    characterizing the optical defects in at least one of location, size and shape.

* * * * *